Figure 1:
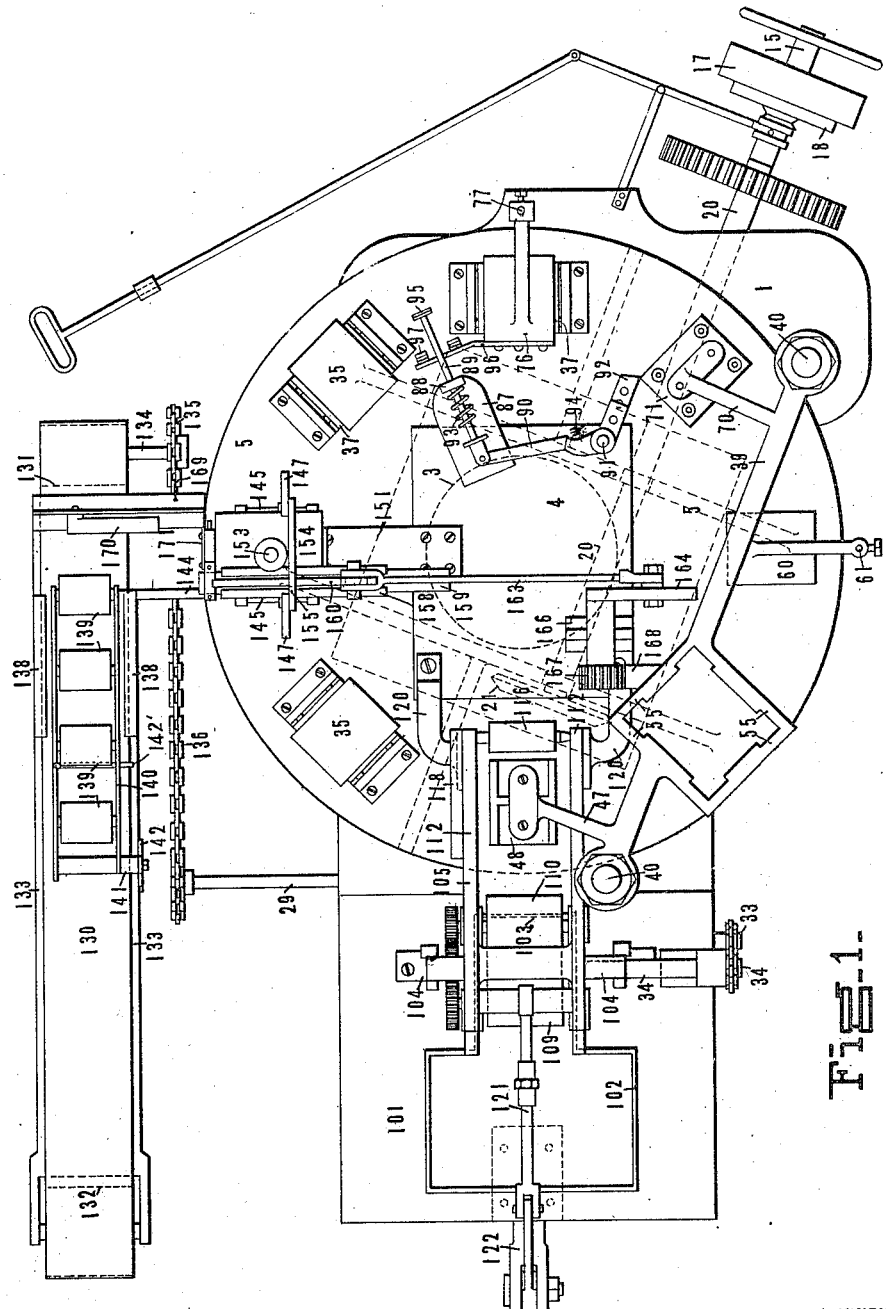

L. C. PALMER.
LABELING MACHINE.
APPLICATION FILED DEC. 17, 1910.

1,019,351.

Patented Mar. 5, 1912
13 SHEETS—SHEET 1.

WITNESSES:

INVENTOR
L. C. Palmer
BY
ATTORNEYS

L. C. PALMER.
LABELING MACHINE.
APPLICATION FILED DEC. 17, 1910.

1,019,351.

Patented Mar. 5, 1912.
13 SHEETS—SHEET 3.

WITNESSES:

INVENTOR
L. C. Palmer
BY
ATTORNEYS

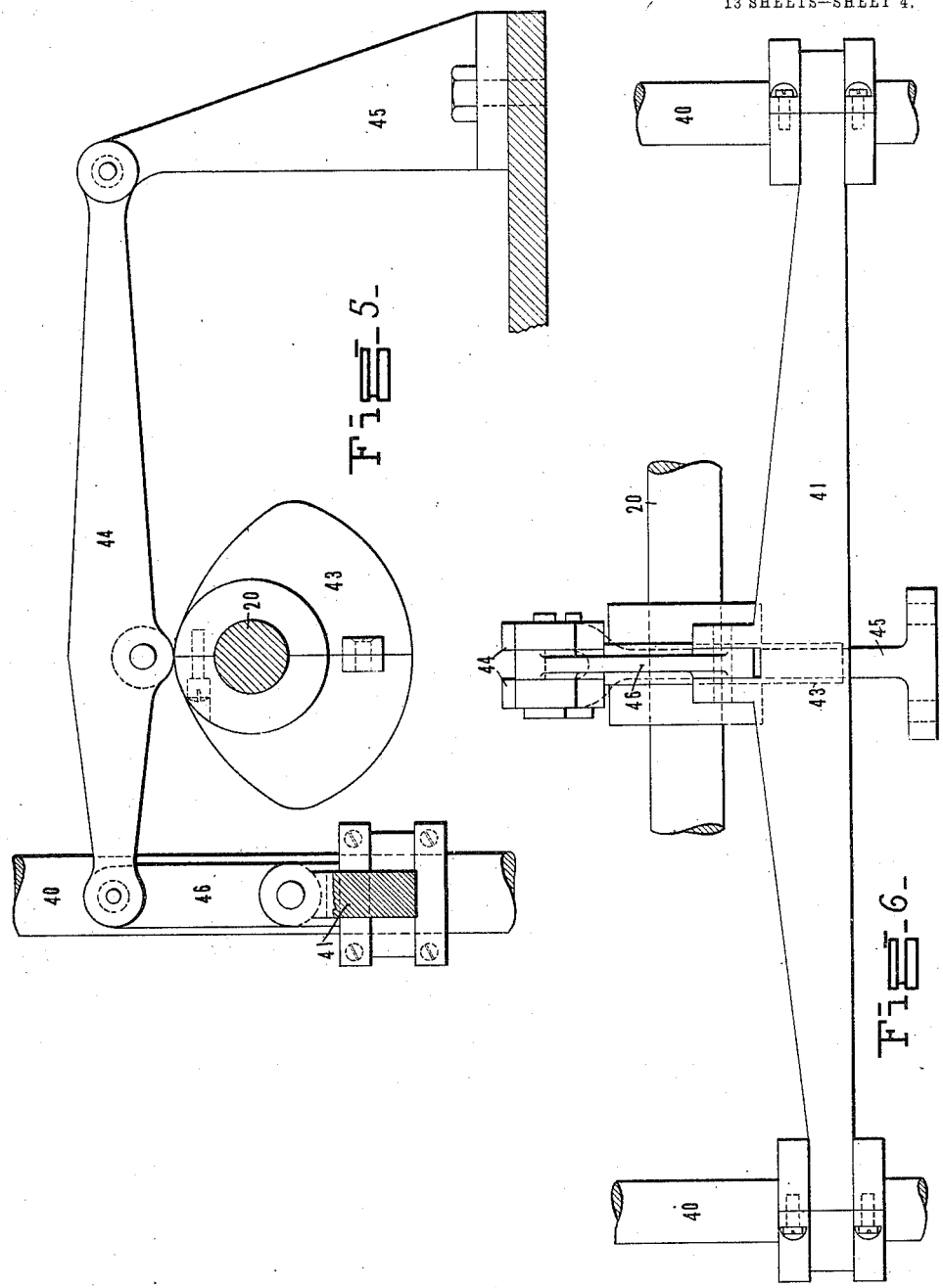

L. C. PALMER.
LABELING MACHINE.
APPLICATION FILED DEC. 17, 1910.
1,019,351.
Patented Mar. 5, 1912.
13 SHEETS—SHEET 5.
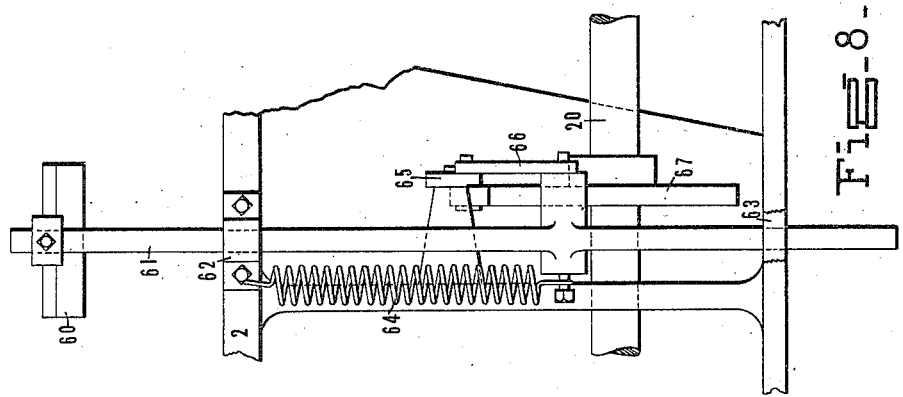
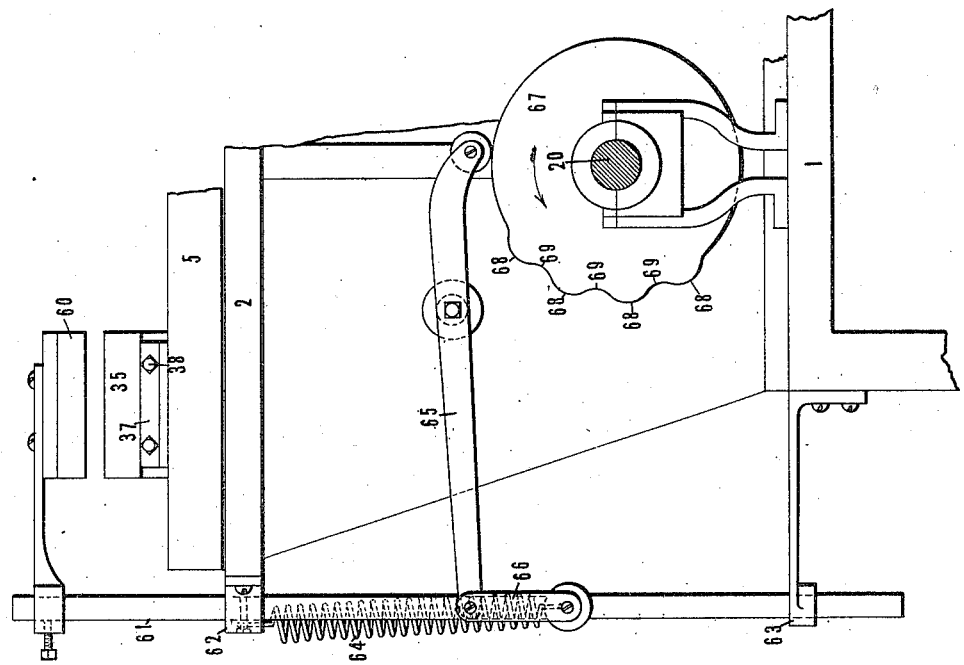

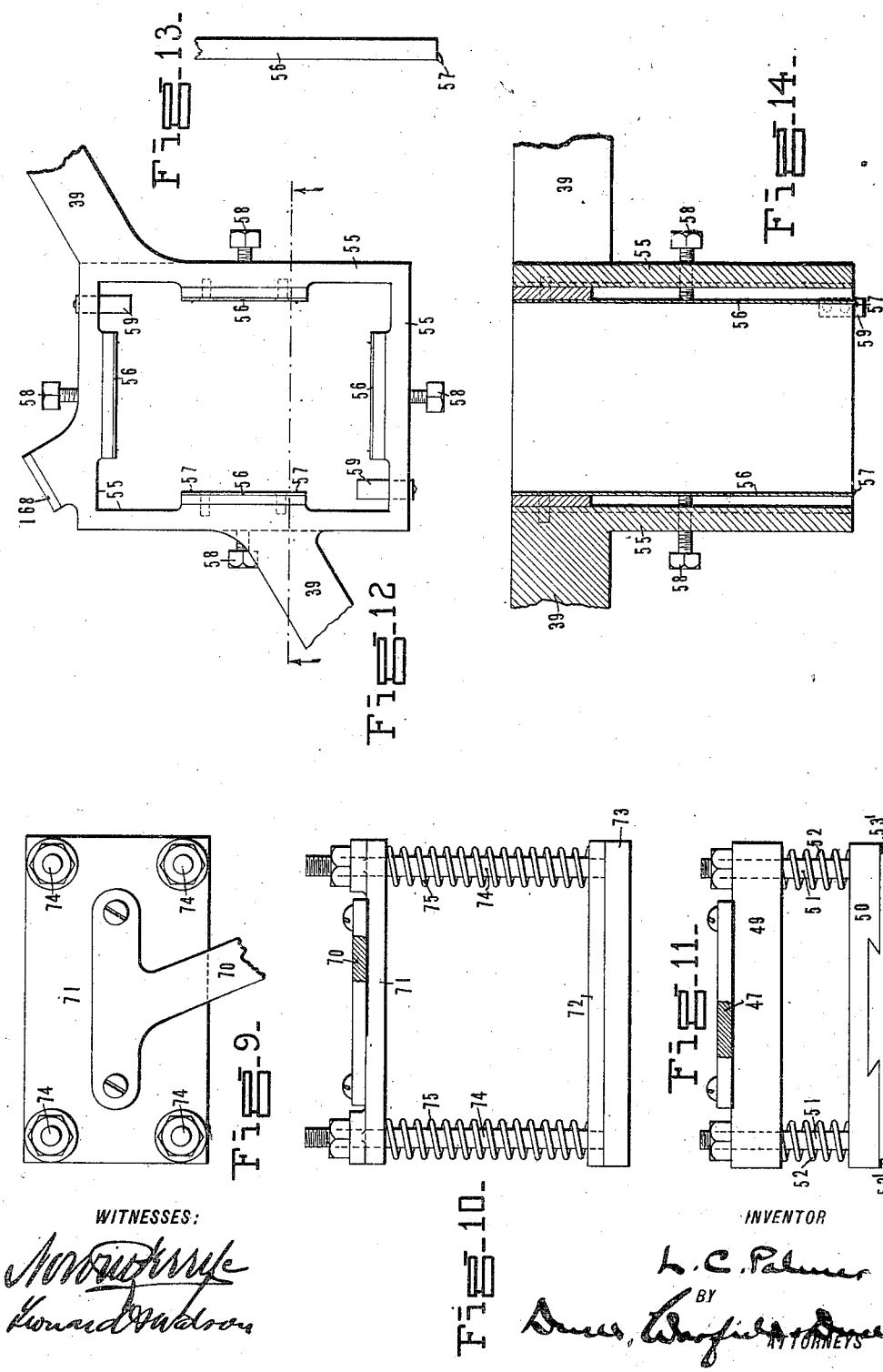

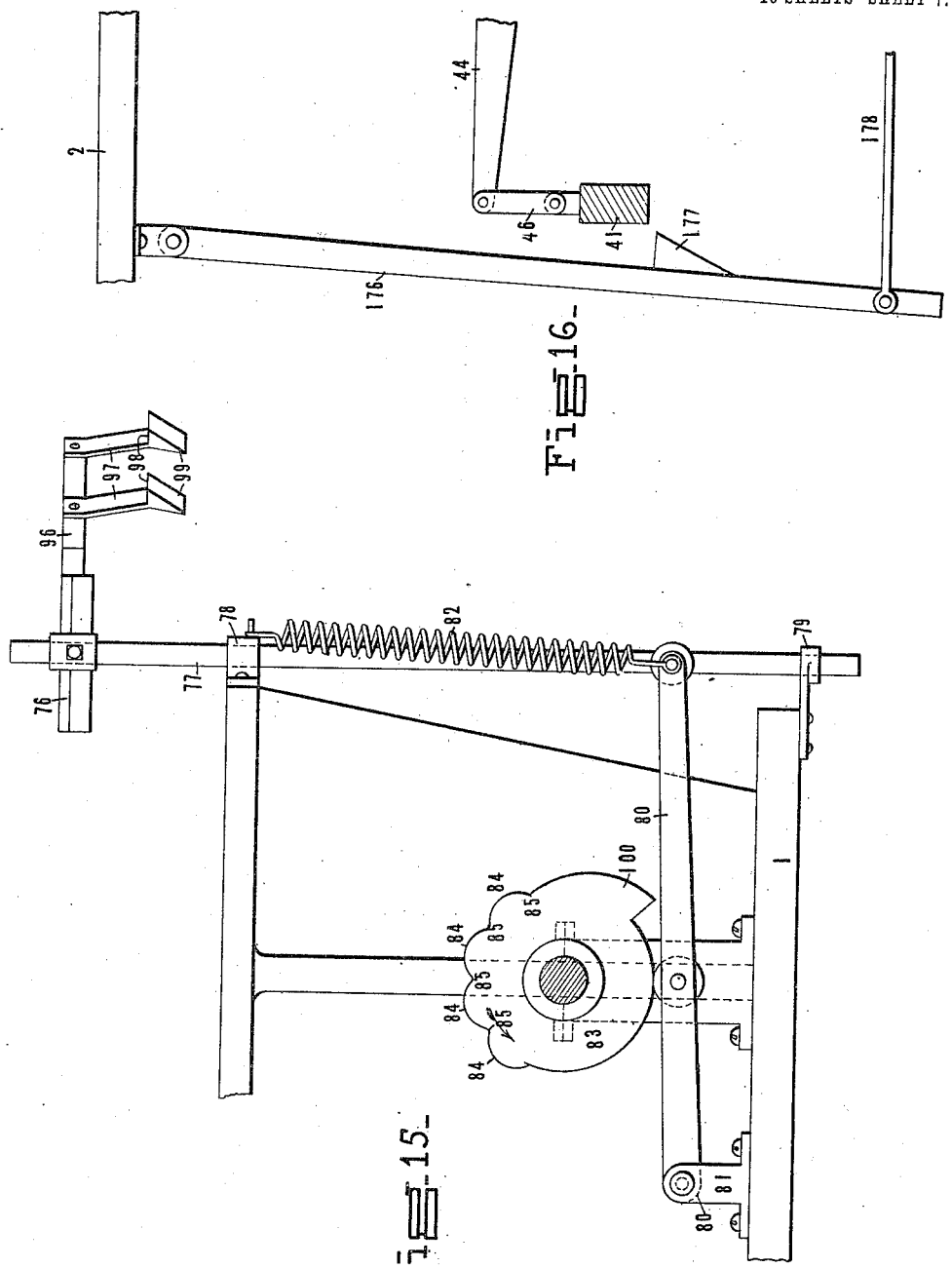

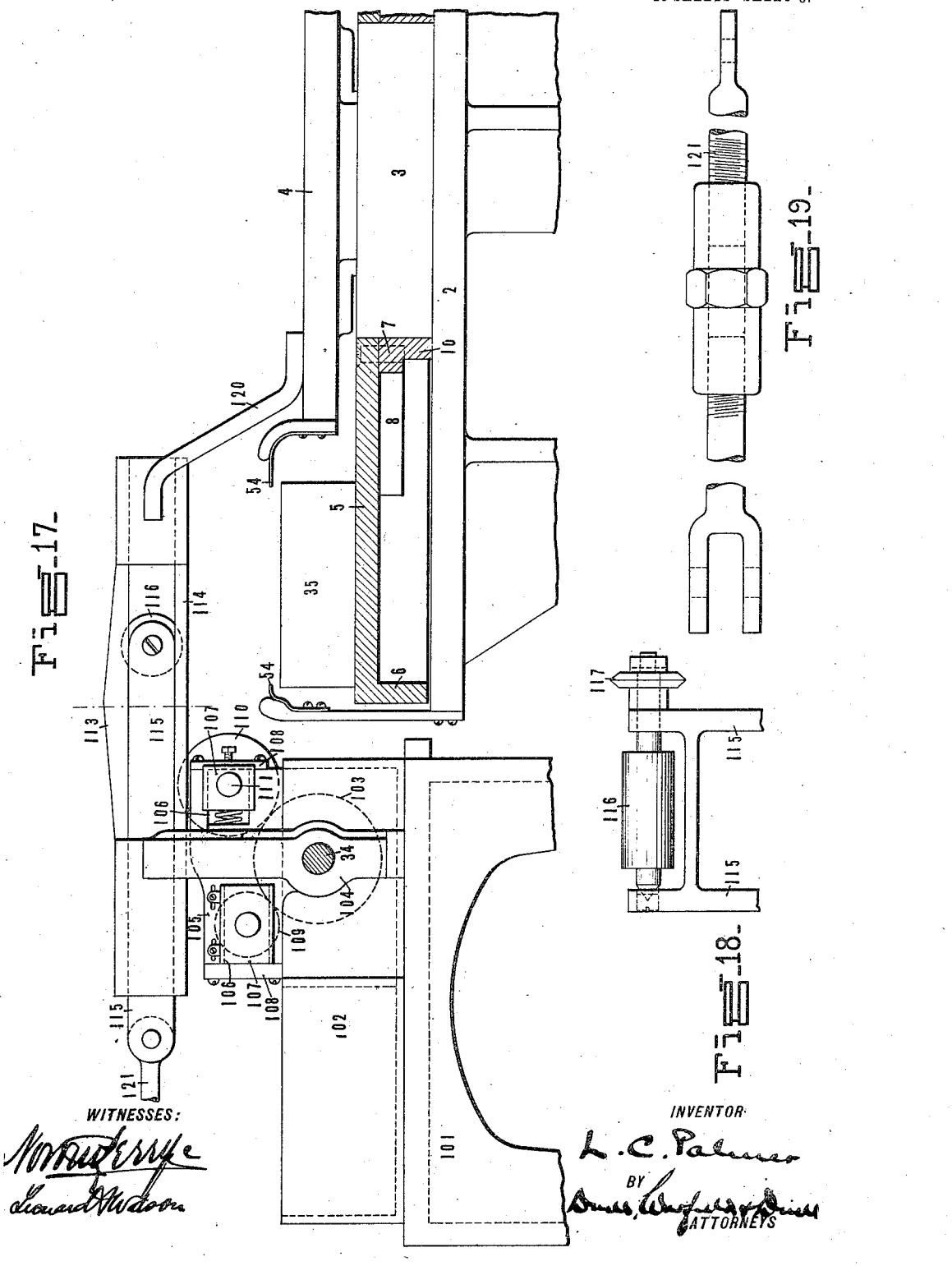

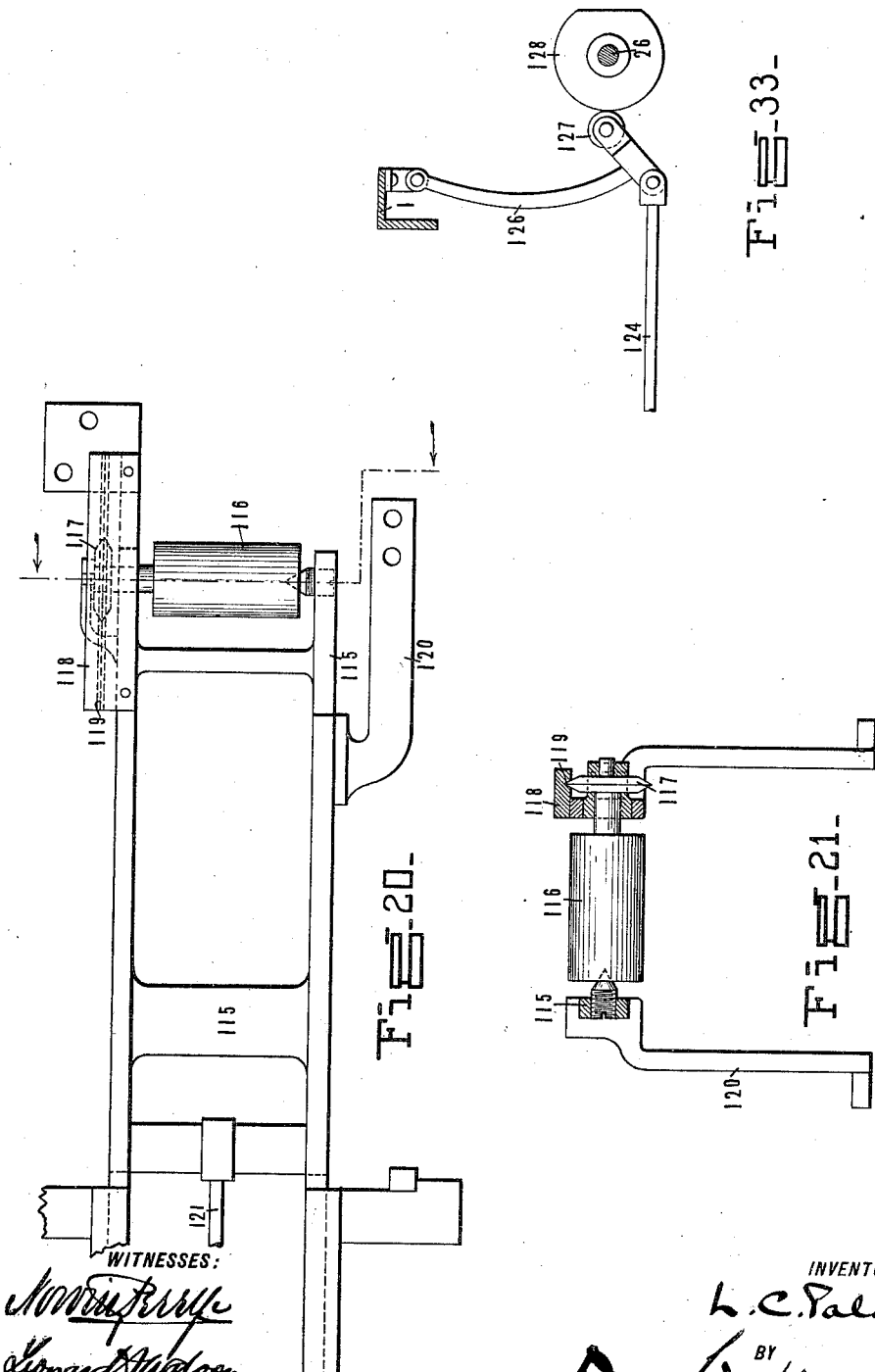

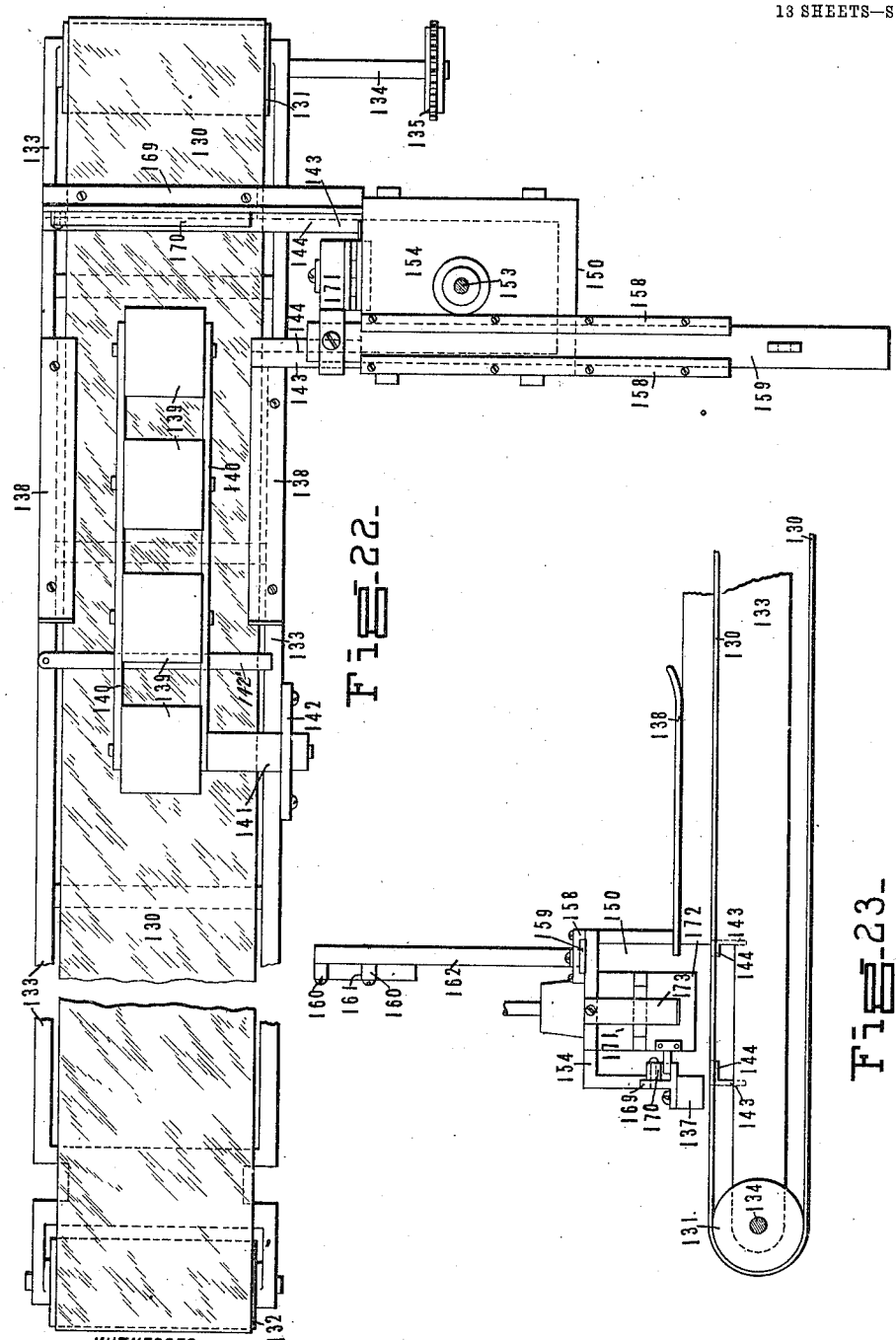

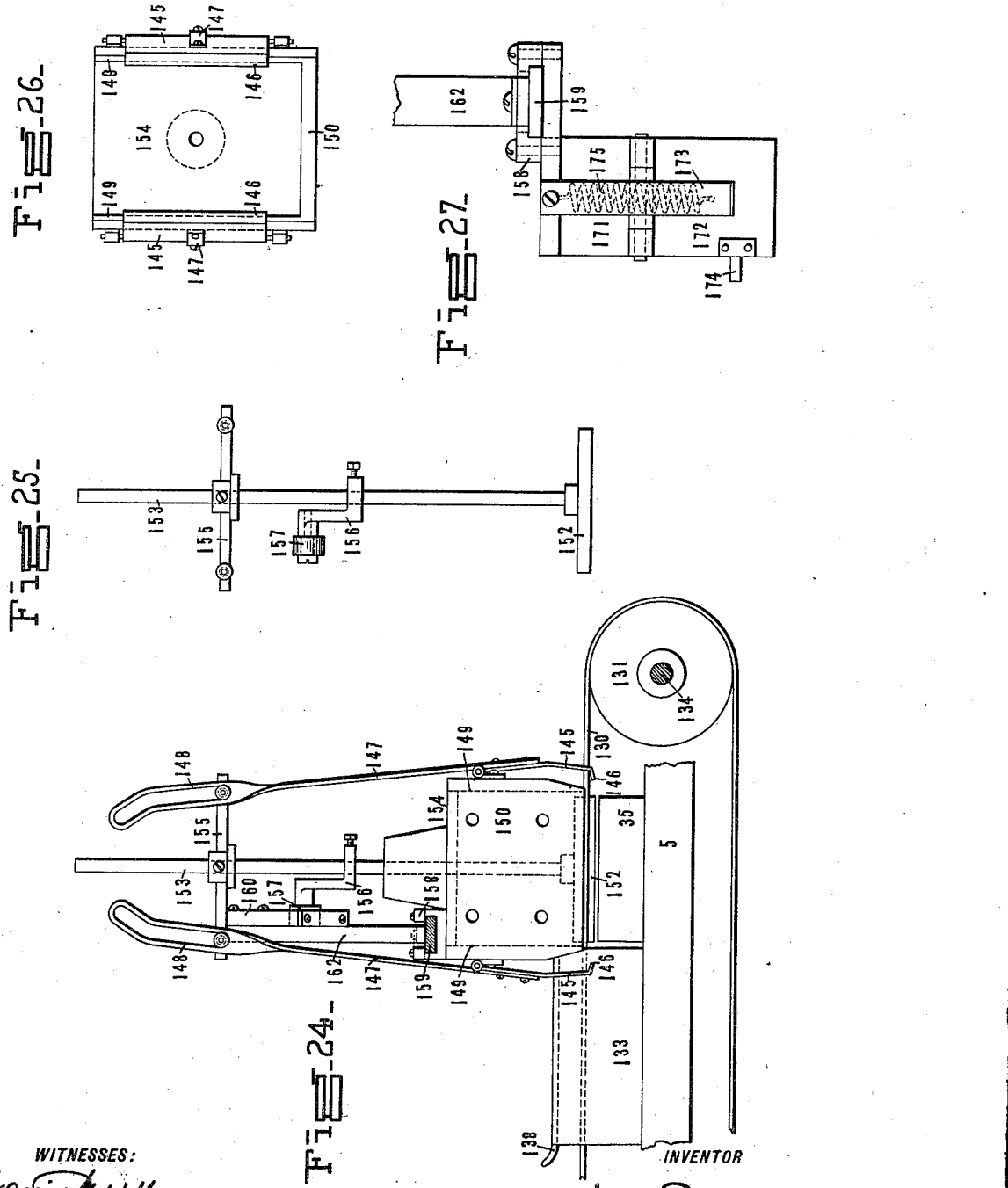

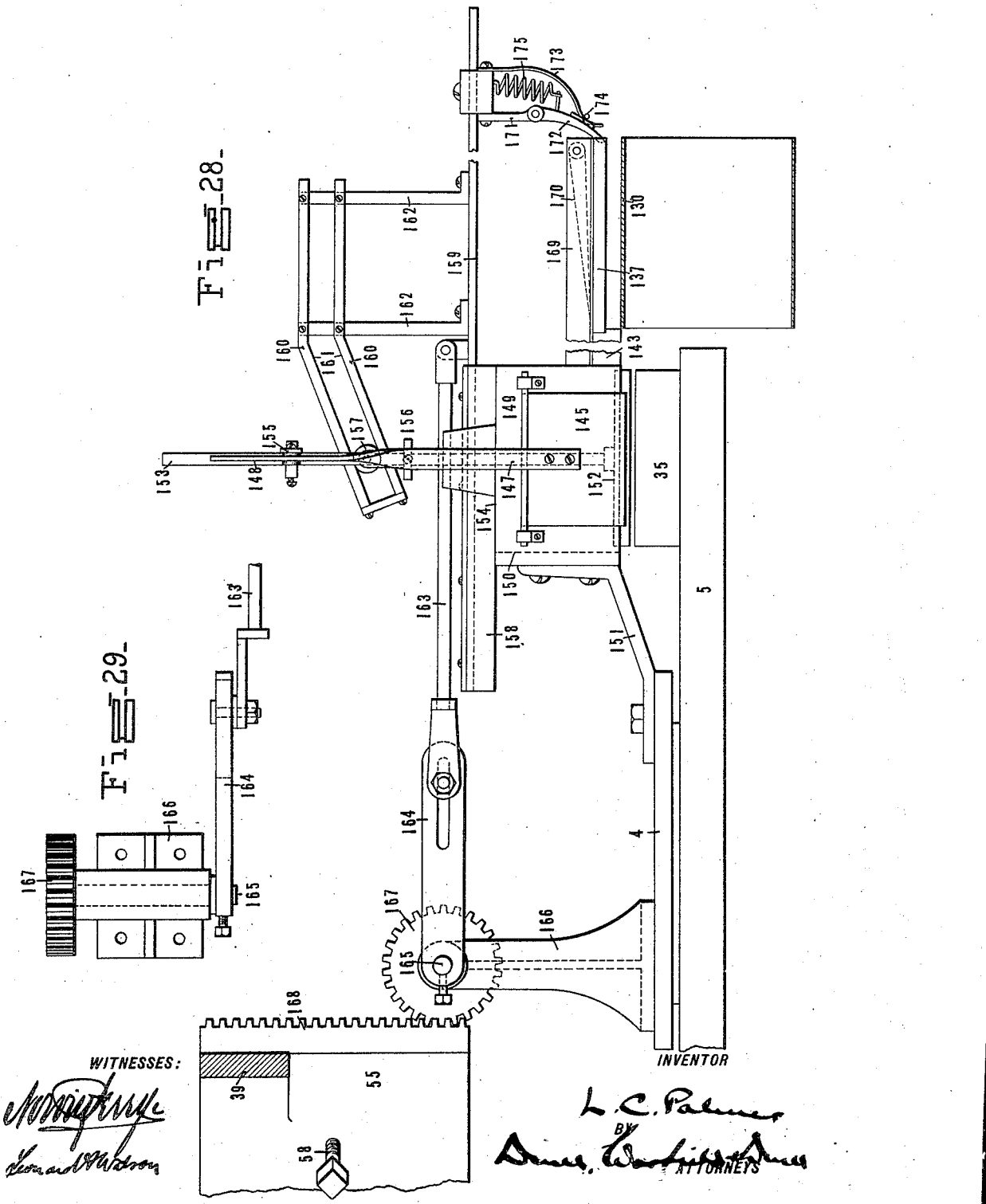

L. C. PALMER.
LABELING MACHINE.
APPLICATION FILED DEC. 17, 1910.
1,019,351.
Patented Mar. 5, 1912.
13 SHEETS—SHEET 13.
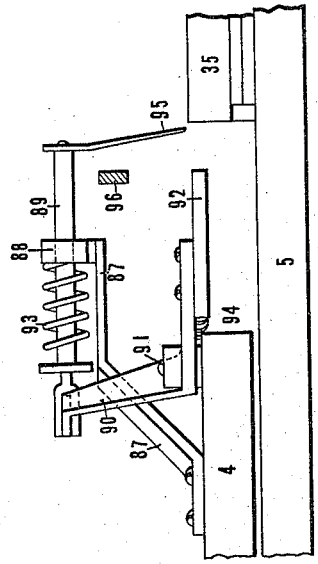
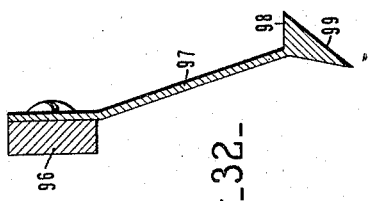
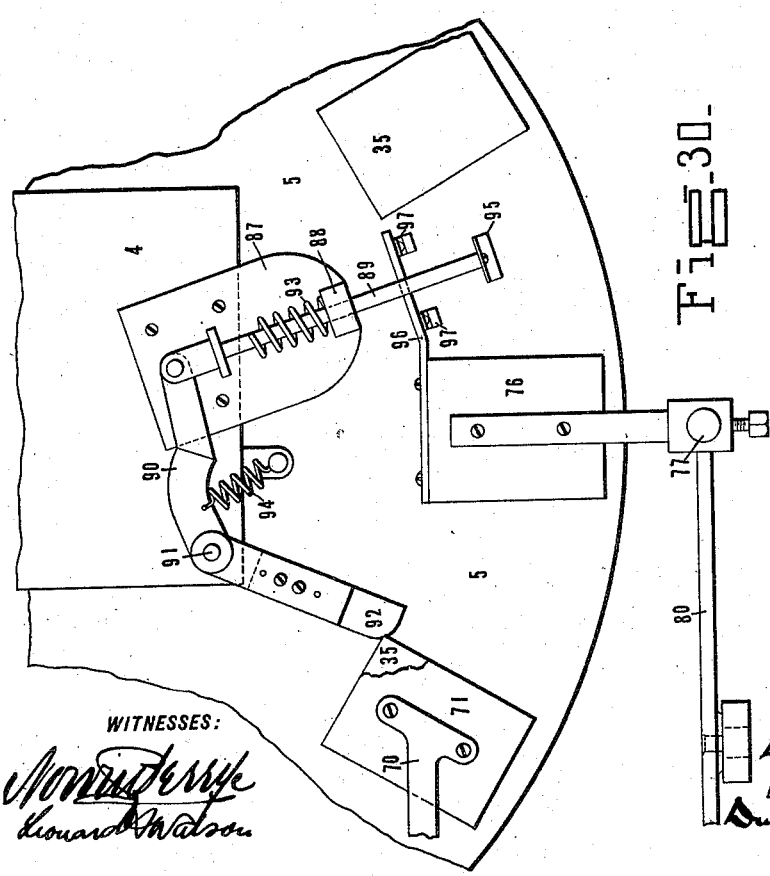
WITNESSES:
INVENTOR
L. C. Palmer
BY
ATTORNEYS

UNITED STATES PATENT OFFICE.

LYNDON C. PALMER, OF BUFFALO, NEW YORK, ASSIGNOR TO THE F. N. BURT COMPANY, LIMITED, OF BUFFALO, NEW YORK, A CORPORATION OF CANADA.

LABELING-MACHINE.

1,019,351.    Specification of Letters Patent.    Patented Mar. 5, 1912.

Application filed December 17, 1910. Serial No. 597,914.

*To all whom it may concern:*

Be it known that I, LYNDON C. PALMER, a citizen of the United States, residing at Buffalo, in the county of Erie and State of New York, have invented certain new and useful Improvements in Labeling-Machines, of which the following is a full, clear, and exact description, such as will enable others skilled in the art to which it appertains to make and use the same.

This invention relates to mechanism for applying labels to articles, and more especially to devices for securing labels to boxes.

One object of the invention is the provision of mechanism for efficiently pasting a label to a box.

Another object of the invention is the provision of a comparatively simple mechanism for applying labels to a large number of boxes in a short space of time.

Another object of the invention is to provide means for effectively applying labels to boxes so as to present a smooth and even surface and thus present an attractive appearance.

Another object of the invention is the provision of means whereby the label is symmetrically arranged with respect to the box.

Another object is to provide a device in which the adhesive is accurately and economically applied to the parts to be glued, without waste and without gumming up adjacent parts.

Still another object of the invention is the provision of a practical and efficient device for feeding boxes into position to be labeled.

Another object is the simple and efficient removal of the labeled boxes from the machine.

Another object is to provide a labeling machine which accommodates itself to the requisites of rapid operation, conserving material and avoiding long stops.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 2:
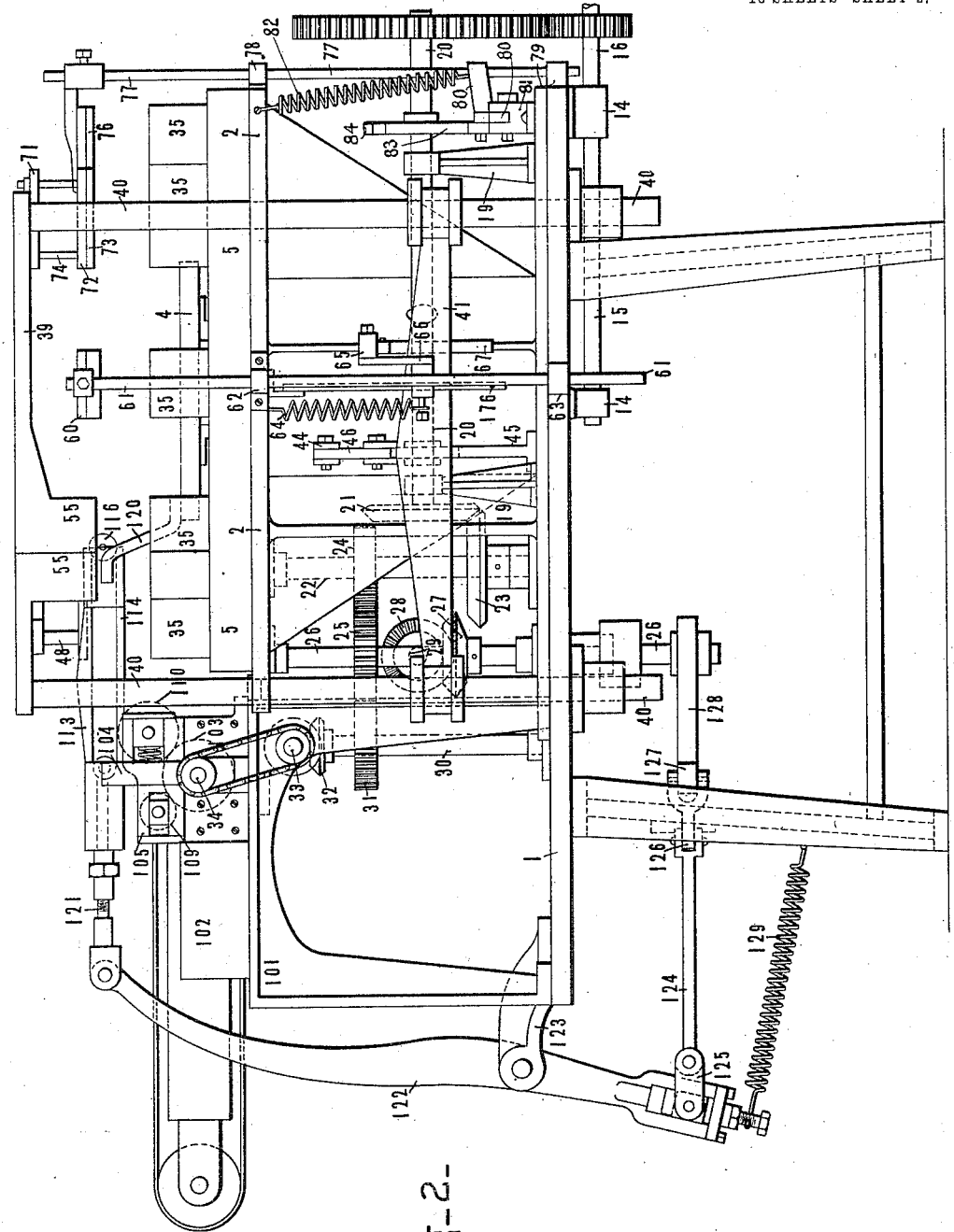
Figure 3:
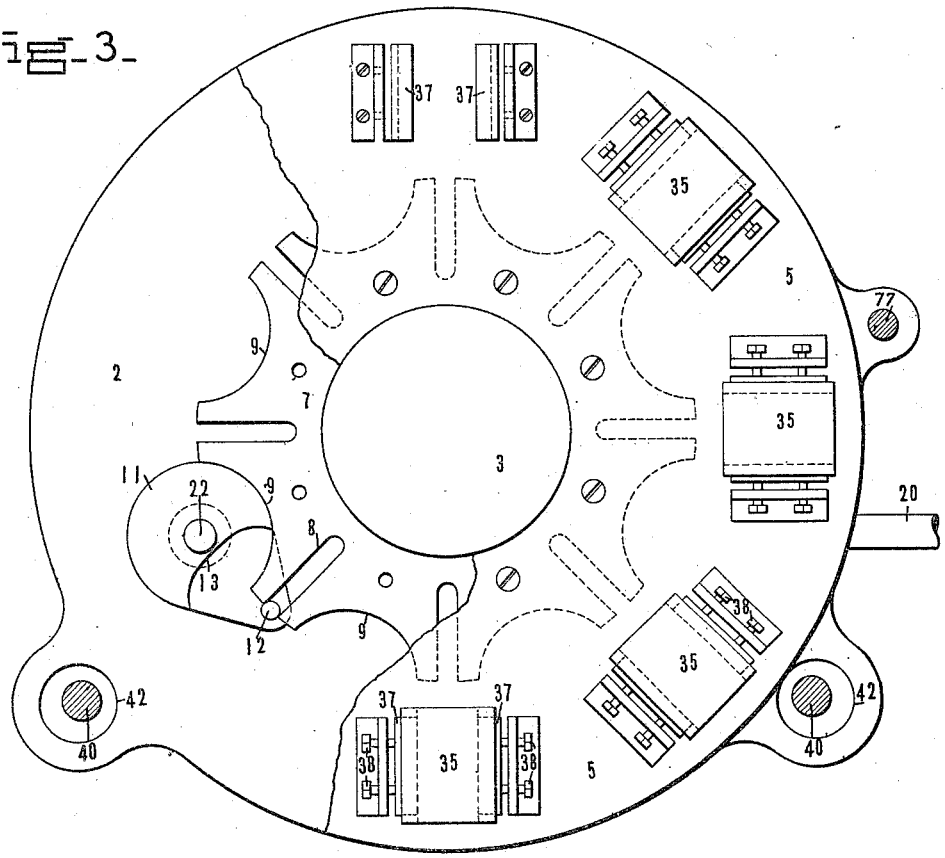
Figure 4:
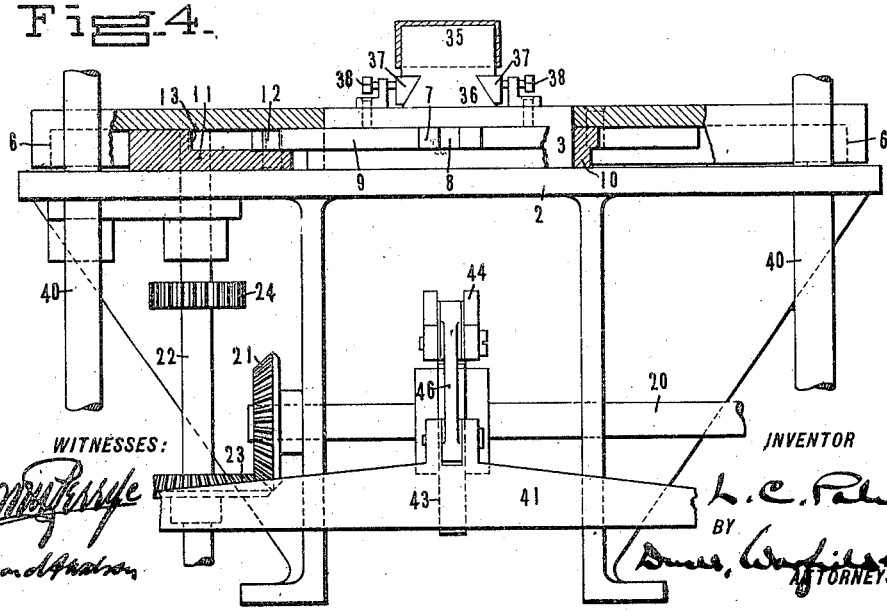

In the accompanying drawings, wherein is shown one of the possible embodiments of this invention, Figure 1 is a plan view of the labeling machine; Fig. 2 is a view of the labeling machine from the side, the main driving shaft and some other parts being shown as parallel to a central line through the glue tank and rotary carrier for convenience of illustration; Fig. 3 is a plan showing the box carrier plate, enlarged, and partly broken away to disclose its operating mechanism; Fig. 4 is an elevation of a portion of the machine, and showing the bed plate and the box carrier plate partly in section to disclose their relationship more clearly; Fig. 5 is a section through the main driving shaft and showing the operating connections for the cross head; Fig. 6 is a side elevation showing the relationship between said parts; Figs. 7 and 8 are enlarged side and front views, respectively, showing one of the auxiliary pressers and its operating connections with the main shaft; Figs. 9, 10, 11, 12, 13 and 14 are detail views of the glue pad, spring presser pad and the label holding device; Fig. 15 is a view showing another of the auxiliary pressers and its operating mechanism; Fig. 16 shows a stop device; Fig. 17 is a side view, partly in section, of a portion of the glue applying mechanism; Figs. 18 and 19 are detail views of some of the parts of the glue applying mechanism; Figs. 20 and 21 are plan and elevation views, respectively, showing the relationship of the glue applying roller and the tension device therefor; Figs. 22 and 23 are plan and elevation views, respectively, showing the box feeding belt and the box retainer; Fig. 24 is an elevation showing the box retaining fingers and their operating devices; Fig. 25 is a detail of a plunger operating in connection with the box retainer; Fig. 26 is an inverted plan showing the pivotal supporting devices for the box retaining fingers; Fig. 27 is an elevation of the picker rod and the attached picker finger; Fig. 28 is an elevation of a portion of the box feeding device and the picker mechanism, showing their relationship to the box retainer and the coöperative mechanism; Fig. 29 is a detail of the operating mechanism just mentioned; Fig. 30 is a plan of a portion of the machine, showing the stripping mechanism; Fig. 31 is an elevation of a portion of the stripper mechanism; Fig. 32 is a detail of a stripper finger; and Fig. 33 is a detail plan of the operating mechanism for the glue roller operating lever.

The general arrangement of the preferred embodiment of the invention, as illustrated in the accompanying drawings, comprises a movable carrier for a plurality of boxes, a box supplying device, by means of which boxes are fed to a certain position adjacent the box carrier; mechanism operating to transfer the boxes from the supply device to the carrier; a gluing mechanism disposed adjacent the path of movement of the box on the carrier; label supporting and manipulating devices, also adjacent the path of the box on the carrier, and adapted at proper times to coöperate therewith, and mechanism for stripping the labeled box from the carrier and throwing it to one side.

The detailed construction of the mechanisms above referred to, may, of course, be varied and their association in different relationships may be indicated by general or specific terms within the spirit of the results accomplished by such associated elements without departing from the invention.

Referring now more specifically to the accompanying drawings, the numeral 1 represents a table sufficiently elevated to dispose the operating mechanism at a convenient height for manipulation and providing space beneath to accommodate a portion of the operating mechanism.

2 indicates an elevated horizontal bed plate having supporting upright webbed portions, and securely fastened to the upper surface of the table. Projecting upwardly from an intermediate portion of the bed plate is a cylindrical bearing 3 terminating in a fixed platform 4 adapted to serve as a support for some of the elements of the machine. A preferably circular rotary box supporting and carrying table or disk 5 surrounds the bearing 3, the periphery of said disk being flanged as at 6 to provide a space between the bed plate and the body of the rotary disk 5 to accommodate operating connections for the disk. Secured to the bottom of the disk 5, within the space above referred to, is a Geneva gear wheel 7 comprising the radial slots 8 and the curved peripheral portions 9. The gear wheel has a depending hub portion 10 which rests upon the bed plate and is secured to and supports the box carrier disk with the bottom portion of its flange 6 slightly above said plate. Thus the hub 10 forms a supporting journal for the carrier 5.

11 indicates a wheel having a pin 12 adapted to engage the slots of the Geneva gear wheel, the wheel 11 having a hub or circular peripheral portion adapted to engage the curved portions 9 of the Geneva gear and lock the same against movement except when the pin coöperates with the slot of said gear. Provision is made for the movement of the Geneva gear by cutting away a portion of the pin wheel, as at 13. With the above-described construction it will be evident that as the pin wheel rotates the Geneva gear is rotated intermittently, step by step, for a certain amount, and between the periods of its movement is locked by the hub of the pin wheel, the concentric portion of the hub of which at that time engages the curved portion 9 of the gear. In the present instance the Geneva gear is rotated one-eighth of a revolution for every revolution of the pin wheel, in order to comport with the operations upon the box in the present embodiment of the invention, as will hereinafter appear.

Journaled in hangers 14 beneath the table is a short horizontal driving shaft 15 having a small pinion 16 and driven by a belt wheel 17 and a clutch 18, which latter may be operated in any suitable manner to throw the shaft 15 into and out of operation. Supported in standards 19 on the table is a main horizontal driving shaft 20 which passes freely through the webs of the bed plate and carries a bevel toothed wheel 21 at its inner end. A first vertical shaft 22 extends from the table 1 through the bed plate and to the end of the same, above the bed plate, is secured the pin wheel 11. The vertical shaft 22 is provided with a bevel gear 23 which meshes with the bevel gear 21 secured to the main driving shaft, the gears 21 and 23 being preferably of the same size. The shaft 22 is further provided with a gear wheel 24 meshing with a gear wheel 25 of the same size on a second vertical shaft 26 suitably journaled and supported between the bed plate and the table 1 and extending through and below said table, for a purpose hereinafter described. The second vertical shaft is provided with a bevel gear 27 meshing with a driving and similar gear 28 on a horizontal shaft 29, through which motion is communicated to the box supply devices, hereinafter described. A third vertical shaft 30 is suitably journaled and supported above the fixed table 1 and has a gear 31 meshing with the gear 25 of the second vertical shaft and of the same size as gear 25 and driven therefrom. The shaft 30 is provided with a bevel gear 32 which communicates motion to a stub shaft 33, which in turn, by means of sprocket wheel and chain connections, drives a horizontal glue feeding roller shaft 34. It will now be evident that the continuous rotation of the main driving shaft 20, from the shaft 15, will communicate continuous rotary motion to the first vertical shaft 22 and to the pin wheel 11, and that for every complete rotation of the main driving shaft the box carrying disk 5 will be rotated through one-eighth of a complete revolution.

To the upper face of the disk 5 are secured blocks or box rests of a size to accurately fit and support in stationary position the elements or boxes to which labels are to be applied. As shown, each box rest consists of a rectangular block 35 having a flat top and sides and a dove-tailed extension 36. The desired number of blocks, in this instance eight, are equally spaced around the disk 5 near the periphery thereof and are adjustably held and clamped in position by complementary wedge blocks 37 engaging the dovetailed portions, and adjusting and clamping screws 38, which, when set up, clamp the rest 35 between the wedge blocks, and at the same time clamp the rest to the disk 5, the screws passing through brackets attached to the disk 5.

As the disk or rotary table 5 is moved by its operating mechanism the box rests move in an endless path intermittently, their periods of rest being preferably longer than their periods of motion. Within the time consumed by each cycle of operation of the machine all the operations from feeding a box to ejecting a labeled box are performed, and a sufficient number of box rests is provided so that the several steps in the production of the labeled box are practically simultaneously performed, though each step in the simultaneous operation is confined to a different box.

In applying a label to an article, and especially in securing a label to an article by means of an adhesive, which is the result accomplished by the present embodiment of the invention, a finished appearance and secure attachment are desirable, and as each securing element or substance has its own attribute, the manipulations to fasten a label to a box by means of one substance, such as an adhesive, might not result in a similar secure attachment if employed in connection with another fastening means. Therefore, while the present embodiment of the invention is designed to embrace any mode or means of attachment which does not depart from its spirit, it is found desirable to perform the operations hereinafter referred to, to the end that labels may be securely attached to the boxes, present a finished appearance and admit of the labeling of a number of boxes in a short period of time.

The present embodiment is intended to label box elements which are open or uncovered, such as one element of a two part cigarette box, and the rests 35 are designed to accurately fit and receive thereover, or "telescope" with such a box, with its head resting in horizontal position on the upper face of the rest which in this embodiment is elevated relatively to the carrier. The face of the rest effectively supports and braces the wall to be labeled, whereby, despite the generally flexible character of the walls, they are prevented from yielding, so that the gluing, labeling and pressing may be efficiently performed, and upon a uniform surface. When the boxes are in inverted position, the top faces of the rests brace the head, while the flanges prevent lateral movement of the box. Complete cigarette boxes are usually composed of two halves or sections, which inclose the articles, each section comprising a head and a peripheral flange, either section being adapted to serve as the container or as the cover. When such open sections or boxes are operated upon in this machine, they are so disposed that when applied to the box rests the head rests upon the surface of a rest which latter supports the head a very important adjunct when the head is of flexible material, as the head is thereby braced, its surface or wall being maintained in such a plane that the glue will be applied uniformly thereover, so that the labels may be affixed thereto and present a smooth and even condition free from wrinkles and air bubbles and uniformly glued. In the present embodiment the inner walls of the boxes are freely engaged by the rests, the flanges fitting nicely therearound and preventing lateral movement relative thereto whereby as the boxes are carried to positions where labeling operations etc. are performed they will be accurately located relatively to said mechanisms despite the relatively free character of their holding means and the labeled wall will be pressed between the pad and the surface of the rest. The boxes are fed to the box rests; glue is applied to the horizontally presented outside surface of the box, a label is placed upon the glued surface, the label is then pressed quickly several times, or patted, as it were, against the box, which latter operation has a tendency to squeeze out any air bubbles which may have been retained beneath the label, and also causes the label to more firmly adhere. A strong but yielding pressure is then applied to the label and finally a further plurality of pressures is applied to complete the labeling operation. Each of these several operations is performed one after the other during the operation of the machine, and finally the box is disengaged or stripped from the rest, being thrown to one side into a suitable receptacle, where it is designed to rest label side up, in order that it may be quickly observed and any unfinished product detected.

It is obvious that one or more of the pressing operations may be omitted without departing from the spirit of this invention, and also that each operation may be performed by a separate operating device, but it is preferred to combine several of the operations by means of a unitary device which simultaneously performs said several operations.

39 indicates a cross head of a movable plunger device operating adjacent the path of the box rests on the disk 5.

40 are the guide and supporting rods of the plunger, which are connected at their upper portions by the cross head 39, and at their lower portions intermediate the bed plate and the fixed table by a cross piece 41 securely clamped to each rod at its ends, respectively. The guide rods 40 respectively pass through alined guide openings in the fixed table and bed plate and their position in said openings may be accurately determined by means of eccentric bearings 42. The plunger is designed to reciprocate vertically, for a purpose hereinafter described, and in order to effect such movement the main driving shaft 20 is provided with a cam 43 which coöperates with the roller of a rock lever 44 pivoted at one end to a standard 45 on the table and at its other end connected by a link 46 to the cross piece 41. As the shaft 20 rotates, reciprocatory motion is communicated to the cross head in a manner which will be obvious from the construction just described, and the contour of the cam 43 is, of course, designed to effect such movement to the proper extent and at the proper time in the operation of the machine. Preferably the standard 45 is located beneath the bed plate between the webs thereof and the lever 44 extends between said webs to the opposite side of the bed plate, where it is connected to the cross head, in the manner described.

The plunger just described carries devices for effecting several of the operations in labeling the box. Laterally projecting from the cross head 39 is an arm 47 which supports a glue pad carrier 48 above and in vertical alinement with the path of the box rests and in that point of the path where the box rests are held stationary by the operation of the driving devices of the carrier disk 5. It is preferable to apply the glue to the boxes by means of a yielding or elastically constructed carrier, and to this end the carrier 48 comprises a plate 49 secured beneath the arm 47 below which is a preferably rectangular plate 50 spaced from plate 49 and loosely secured thereto by means of pins 51 attached to the corners of the plate 50 and passing freely through openings in the plate 49, nuts being threaded on the pins 51 above the latter. Around each pin 51, between the plates 49 and 50, is a spring 52 tending to resist movement of said plates toward each other. The glue carrier is provided with a suitable glue retaining surface, preferably a removable pad 53 of sponge rubber covered with canvas the glue retaining surface of the pad preferably corresponding in extent with the portion of the box to be glued, so that the glue will be applied to a definite portion of the box wall, the labels being superposed thereon and neatly glued at their edges as well as at their body portions to the box wall. It is designed to apply glue to the pad and to subsequently lower the pad so that its glued surface shall contact with the box on the box rest immediately therebeneath, this latter movement being accomplished by the downward movement of the cross head 39. Inasmuch as the pad may be reciprocated by the cross head when the box is not in position on the rest, it is designed that the pad, under such circumstances, when in its lowest position shall not touch the upper surface of the box rest. Fingers 54 are accordingly secured to the bed plate 2 and the platform 4 and project horizontally over the edges of the rest. The distance between the fingers 54 and the surface of the rest 35 is such that they will contact with the shoulder 53' of the glue pad and stop its descent before it reaches the surface of the rest. When a box is in position on the rest, its thickness fills up a part of the distance between the fingers and the upper surface of the rest, permitting the glued surface of the pad to contact with the box. When the glue pad retreats from glue applying position on the box the latter might adhere to the pad, and the fingers 54 also serve as strippers to detach the box from the pad.

On the cross head 39 is a label holder which preferably comprises rectangularly arranged vertical walls 55 cast integral with the cross head. The walls are of a sufficient vertical extent to accommodate a series of superposed labels. Depending from the inner face of the upper portion of each wall are elastic devices consisting of thin steel plates 56 oppositely arranged in pairs and having small fingers or pointed projections 57 at their bottom edges, which projections extend inwardly and serve to partially support the labels. The series or bundle of labels is placed in the holder with the plates 56 engaging the edges of the labels of the bundle, and by means of the set screws 58 said plates may be adjusted toward and from each other to grip the bundle of labels with more or less tension, thus supporting the labels sufficiently securely in position, but permitting them to feed downwardly by gravity as the labels are successively removed from the bottom of the bundle. The plates 56 extend substantially vertically through the holder and are so located that, when the holder is moved toward the box rest which may be thereunder, the bottom label of the bundle contacts with the surface of the box which has been glued in the manner hereinbefore referred to.

It will be observed that the label holder is of substantial construction, and that its location on the cross head, which is accurately guided in its movements, conduces to the accurate and symmetrical application of the label to the box, the parts being once adjusted. On the retreat of the label holder the bottom label adheres to the box and is withdrawn from the holder, the points 57 permitting the passage of this label, but efficiently restraining more than one label being withdrawn. As the retreat of the label holder might tend to draw the box from its rest should the bottom label for any reason adhere thereto or to the bundle of labels, light springs 59 are secured to project inwardly from opposite walls of the holder, preferably at diagonally opposite points, and at a distance vertically from the wall of the holder. When the label is applied to the box the springs 59 are flexed and their recovery on the retreat of the holder retains the box upon its rest until the label has been disengaged from the bundle.

Reciprocating in vertical alinement with the path of the boxes, at a point in the path where the box is temporarily arrested, after the label has been transferred to the box, is an auxiliary presser block 60, which may be shod with a suitable yielding material, such as sponge rubber. This pressure block is designed to give the first pressure to the label after it has been applied to the box, and it is obvious that said presser block may be connected with the cross head. It is desirable, however, to at this time apply to the label a series of blows or taps tending to spread the label in an even surface over the box and squeeze out any air bubbles which may have collected beneath the label. To this end, therefore, the presser 60 is carried by a vertically reciprocating rod 61, to which it is adjustably secured, said rod reciprocating in guides 62, 63 attached to the sides of the bed plate and the table, respectively. A spring 64, fastened at its upper end to the bed plate and connected at its lower end to the rod 61, tends to maintain the presser 60 in elevated position. A lever 65 is connected at one end to the rod 61 by means of a link 66, and the other end of the lever coöperates with a cam 67 on the main driving shaft. Said cam is provided with a series of alternate and comparatively closely arranged raised and depressed portions 68, 69, which positively and quickly vibrate the presser 60 several times when the label is in position therebeneath, thus applying thereto a series of taps or blows, for the purpose above explained.

Projecting laterally from the cross head 39, in alinement with another stationary portion of the box rests, is an arm 70 which supports another presser block comprising the presser block carrier 71 and a plate 72 having a face or shoe 73 of sponge rubber, said plate being spaced and loosely supported from the plate 71 by means of the guide rods 74, projecting from the plate 72, and loosely passing through openings in plate 71, springs 75 surrounding the rods 74 and interposed between the plates 71 and 72. It will be seen that as the cross head reciprocates this presser pad will descend upon the label and press the same against the box with a pressure depending upon the strength of the springs 75.

At still another point in the path of the box, where the box temporarily comes to rest, is an additional auxiliary presser block 76 similar in construction to the block 60 and, like it, designed to apply a series of blows, and in this instance the pressure applied may be stronger than that applied by the blocks 60, if desired. The presser block 76 is adjustably connected to a rod 77, adapted to reciprocate in guides 78 and 79 on the bed plate and fixed table. One end of a lever 80 is fulcrumed on a short standard 81, and its opposite end is pivotally connected to the rod 77. A spring 82 connected to the rod and bed plate yieldingly holds the presser block 76 in elevated position. A cam 83 is arranged in the shaft 20 to operate the lever 80, and like the cam 67 has a series of alternate and comparatively closely arranged raised and depressed portions 84 and 85 which positively and quickly vibrate the presser 76 against a labeled box therebeneath. Located to one side of the path of the boxes, at a point in the path where the boxes pass after having been labeled, is a stripping mechanism designed to remove the boxes from the box rests and throw them to one side into a basket or other suitable receptacle. As has been hereinbefore described, the bearing 3 of the bed plate terminates in a platform 4, and said platform may extend partially over the disk 5 to provide additional area, without interfering with the movement of the boxes. Mounted upon the platform is a bracket 87 having an upstanding perforated guiding lug or shoulder 88. A plunger rod 89 is designed to horizontally reciprocate in the opening in the shoulder and radially or transversely of the vertical plane of movement of the boxes. The rear portion of said plunger is pivotally connected to one end of an operating trip lever 90 intermediately pivoted at 91 on the platform 4 and having an adjustable trip finger 92 adapted to coöperate with a series of fixed projections on the rotary carrier 5.

In the present embodiment of the invention the blocks or box rests are made use of as fixed projections, the extremity of the trip finger being disposed in the path of one of the corners of each block so that said corners will contact with the extremity of the trip finger and operate the lever 90 to retract the plunger 89. A spring 93 surrounds the rod 89, between the lug 88 and a collar on the inner portion of the plunger, this spring being preferably freely movable longitudinally on the plunger rod when the rod is in retracted position. A spring 94 connected at one end to the trip lever 90 and at its other end to a lug on the platform 4, throws the lever in opposition to any movement communicated thereto by the projections on the box carrier. The plunger 89 is horizontally disposed above the upper surface of the box rests and has a depending finger 95, which terminates short of the upper surface of the box rests and, when not retracted, the finger 95 hangs vertically over the path of the rests. A bar 96 is secured to the presser 76, extends beneath the plunger 89 and has two depending resilient arms 97, one on either side of the plunger and having projecting hooked portions 98 and lower beveled portions 99. The cam which operates the auxiliary presser 76 is provided with an operating portion 100 which depresses the hooks 98 below the upper surface of the box rests 35, and said projections are designed to engage the lower edges of the boxes and raise the same from the rests at their inner side.

The operation of the stripping mechanism will now be apparent. As the boxes come to rest, a corner of one of the box rests will contact the tripper finger 92 or be about to do so. While the boxes are at rest the presser 76 will vibrate and perform its pressing operation upon the label thereunder, the projections 98 of the stripper fingers 97 playing up and down beneath the edge of the box. As the box rests then begin to move, the one in contact with the trip finger 92 will at once cause the retraction of the plunger 89 and place the finger 95 inside of but closely adjacent the path of the boxes. Immediately thereafter and while the box rests are moving, the high portion of the cam which operates presser 76 becomes effective and said presser will be depressed to a greater extent than when it was vibrated and the projections 98 will engage beneath the inner edge of the box and lift the lower edge of the box on that side above the upper surface of the box rest 35, thus placing the box horizontally in position before the retracted spring finger 95, and at this time the finger 92 escapes its operating projection, in this instance the wall of the box rest, and the spring 94 thrusts the finger 95 forwardly, causing it to push or knock the box from the rest, the spring 93 acting as a yielding stop and maintaining the finger 92 in the path of the next rest or projection. On account of the inclined position which the box assumes when raised by the fingers 97, in the manner hereinbefore described, the blow of the finger 95 not only throws the box to one side, but causes it to turn so as to drop, label side up, into a receptacle placed at a suitable and convenient point.

In the present embodiment the stripping action is effected directly the box leaves the presser 76, and while the rest carrying the box is moving from the position opposite the presser 76 to immediately succeeding stationary position. Obviously, however, the invention is not limited to stripping the box in this particular position and the arrangement and proportion of the parts may be modified to effect the stripping at any other suitable point.

The preferred substance to secure the labels to the boxes comprises an adhesive such as paste or glue, the same being applied to the parts by mechanism which automatically and accurately coats one of the parts, preferably the box element, with the adhesive. It is evident, however, that the coating mechanism may be employed to coat parts with other substances which would take part in effecting the affixing of the label to the box, and such uses are therefore not outside the purview of this part of the invention.

Glue is applied to the glue pad by a roller moving thereover and to and from a glue supply device. Mounted on the fixed table 1 is a glue tank table 101 which is substantially in line with an extension of the bed plate 2. Supported upon the glue tank table is a glue reservoir comprising a glue tank 102, through which passes the shaft 34 of a glue feeding roller 103, which dips into the glue in the tank. The shaft 34 passes through the sides of the tank 102 and is supported by standards 104 on either side of the tank. Mounted at opposite sides of the forward portion of the tank are plates 105 which extend above the tank and have horizontal slots 106 in their forward and rear edges, in which are located bearing boxes 107 held in place in the slots by plates 108 secured respectively to the inner and outer edges of the plate 105. Supported by the bearing box in the rear slot 106 is a gage roller 109 which may be adjusted toward and from the feed roller to regulate the thickness of the glue carried beyond the gage roller and transferred to the glue delivery roller 110, which is mounted parallel with the feed roller 103 on a shaft 111 supported in the forward bearing box 107. A spring is interposed between the forward bearing box and the rear wall of the slot 106, to provide for the ready adjustment of the roller 110 toward and from the roller 103, by a set screw, as clearly shown. The amount of adhesive taken from the roller 103 may be quickly regulated by this means. The gage roller and the supply roller are continuously driven through toothed gears attached thereto respectively outside the tank, and meshing with a gear wheel on the shaft 34.

The standards 104 extend toward each other at their upper portions and support one end of horizontal guide rods 112 in substantially vertical alinement with the walls of the glue tank. Each guide rod 112 is composed of upper and lower parallel portions 113, 114 spaced apart and forming slots therebetween within which reciprocates the sides of a frame 115 formed of parallel spaced connected bars having removably mounted at one end between the bars a glue applying roller 116. The shaft of the roller 116 extends through its supporting bar at one side and is provided with means to govern the rotation of the supply roller, in this instance comprising a disk 117 fast to the shaft and adapted to contact with a friction plate 118 projecting from one side of the upper surface of one of the guide rods 112 adjacent that point in the path of the delivery roller where the glue is applied to the pad. Preferably the disk 117 has a beveled edge and the friction plate is provided with a groove 119 having inclined walls to receive and guide the edge of the roller 117. Brackets 120 project from the platform 4 and serve to support the guide rods 112 at their inner ends. The frame 115 is adapted to reciprocate in the guide bars 112 to move the roller 116 from the glue supply roller 110 to the glue pad and in order to effect this movement, said frame is pivotally joined at its rear portion by an adjustable connecting rod 121 to the upper end of a glue roller operating lever 122 fulcrumed on a bracket 123 mounted on the supporting table of the machine, the lower end of the lever 122 being pivotally joined to a connecting rod 124 by a link 125. Mounted beneath the table 1 is a horizontal rock arm 126 pivotally connected to the rod 124 and provided with a cam roller 127 which is engaged by a horizontally arranged cam 128 immediately driven from the lower portion of the second vertical shaft 26. A strong spring 129 is connected to the end of the lever 122 and to the frame of the machine to maintain the roller 127 in contact with the cam and cause the operation of the lever 122 in one direction. In operation, the main driving shaft communicates motion through the gears 24 and 25 to the shaft 26, which in turn, through the cam 128, the lever 122 and connecting devices, reciprocates the frame 115, moving the roller 116 and delivering glue from the glue supply roller to the glue pad on the cross head 39. The movement of the roller 116 across and in contact with the face of the glue pad preferably takes place while the box rests are moving from one position to an immediately succeeding position, and consequently the glue pad is at a sufficient elevation at this time to permit the roller 116 to pass across the path of the boxes and apply glue to the pad without coming in contact with the boxes. The glue transfer roller being separate from the glue tank offers a means of renewing the supply of glue in the tank and otherwise attending to the same without interfering with the transfer of glue to the pad.

When the glue applying roller 116 leaves the rotating roller 110, or rolls off of either end of the glue pad, rotary motion has been communicated thereto which may continue until said roller again makes contact with the pad. This motion may be the reverse of that given by its next contact with the pad, and under such conditions a disproportionate amount of glue might be applied to the pad at its edge, and it is desirable, therefore, to bring the roller in contact with the pad while the roller has no rotary motion, or motion only in the direction which is given by immediate subsequent contact. Furthermore, the roller, when applying glue to the pad, should preferably roll thereon. Mechanism is accordingly provided to govern the rotary motion of the roller 116 before it contacts with the pad and to insure rolling motion while in contact, comprising the friction roller 117 and the plate 118. Friction roller 117 contacts with the plate 118 just before the roller contacts with the pad and in its passage across the pad the friction roller 117 rolls along the plate 118, the direction of its rotary movement on the plate being the same as that of the rotary movement communicated to the roller 116 by its movement across the pad. When the roller 116 leaves the pad it might continue to rotate until it returned thereto and for this reason the friction plate 118 projects beyond the opposite end of the pad so as to contact with the friction roller 117 just before the delivery roller contacts with the pad on its reverse movement. Thus the contact of the roller 116 with the pad is made when the roller has practically no rotary motion or has rotary motion in the same direction as that communicated thereto by contact with the pad, and in this manner is prevented the application of a disproportionate amount of glue to the ends of the glue pad and the subsequent application of a blot of glue to the surface of the box, as explained above, thus effecting the application of a uniform surface of adhesive to the boxes.

It is apparent that the articles to which labels are to be applied may be placed upon the blocks 35 by hand or by a suitable automatic mechanism, and as it is designed to produce a labeling machine which shall perform all of its functions automatically, including the feeding of the boxes, the automatic feeder shown in the drawings efficiently and specially coöperates with the type of label affixing device. The endless belt 130 is supported upon rollers 131, 132 on a frame 133 disposed adjacent the periphery of the box carrier 5, the upper or feeding side of the belt being slightly above the upper surface of the box rests 35. The frame 133 comprises parallel side bars between which the upper ply of the belt passes, and inwardly projecting horizontal flanges which support the belt, said bars projecting a sufficient distance above the surface of the upper ply of the belt to provide guiding walls for the box. Connected to one of the rollers 131 is a shaft 134, to which is secured a sprocket wheel 135 driven by a chain 136 from the horizontal shaft 29, which latter is driven from the second vertical shaft 26 in the manner previously explained. The boxes are placed on the belt by hand with their open sides down and are fed forwardly by the belt to a certain position which is determined by a stop or cross piece 137 suitably supported across the belt in line with the path of the boxes. As the belt moves continuously a series of boxes thereon will extend from the stop 137 toward the other end of the belt, and as the rearmost boxes are pressed forwardly by the belt the boxes under some conditions tend to rise or buckle, as it were, and in order to prevent this and maintain the boxes in proper frictional contact with the belt, the sides of the frame 133 are provided with horizontal flanges 138 which project across the guideway above the boxes, and a yielding pressure device consisting of a series of weighted rollers 139 journaled between plates 140, is pivotally connected at one end to a stub shaft 141 projecting from a bracket 142 secured to the side of the frame 133 adjacent the inner end of the belt. Both the flanges 138 and the series of weights or rollers 139 are located at that portion of the guideway near the stop or the point where the boxes are subsequently removed from the guideway. The flanges 138 are provided with upturned curved ends to facilitate the passage of the boxes therebeneath. A pivoted rest 142' may be thrown across the belt beneath the rollers to keep them out of contact with the belt when desired.

Extending at an angle to the direction of feed of the boxes by the endless belt at a cut-away portion of the inner side of the frame 133 is a guideway comprising spaced horizontal bars 143 having flanges or tracks 144 to support the edges of the sides of the boxes. These tracks lead to a stationary alining and retaining device for the boxes located above the rotating table, to which retaining device the boxes are transferred from the endless belt carrier. Above this guideway suitable projecting flanges are provided to keep the boxes on the tracks. The retaining device comprises a support to temporarily maintain the boxes above the line of movement of the box rests, and from which the boxes are delivered onto the rest when it alines therewith in its temporary stationary position. The preferred embodiment of retainer herein exemplified comprises pivoted supports, plates or fingers 145, the lower ends of which have inwardly projecting flanges 146 and which fingers comprise upwardly projecting arms 147 having cam slots 148, the upper parts of said slotted arms having oppositely inclined portions for a purpose which will hereinafter appear. Preferably the retaining fingers 145 are pivoted upon the outside of spaced vertical walls 149 connected at one end by a wall 150, and being unconnected at their opposite ends, leaving an opening through which a box may pass horizontally into position between the walls 149. The structure composed of the walls 149 and 150 is supported upon a bracket 151 extending from the platform 4, and said walls are accurately alined with the position of the box rest when the latter is stationary thereunder, so that a box fed between the walls 149 will be stopped by the wall 150 and be in position with its side walls in telescopic alinement with the sides of said box rest. The flanges 146 of the fingers 145 are designed, when in inner position, to project inwardly beyond the inner face of the walls 149 to support the edges of a box which may be fed between said walls and prevent the same from dropping therefrom. Preferably the outer faces of the walls 149 are beveled at their bottom portions and the fingers 145 bent to conform therewith.

Reciprocating vertically in the space between the walls 149 is a plunger 152 having a rod 153 guided in a cross piece 154 preferably forming a top or brace for the walls 149. The purpose of the plunger 152 is to positively move the box from the retainer onto the box rest 35. The upper portion of the rod 153 carries adjustably a transverse bar 155 having rollers at its ends which engage the slots 148 in the arms of the fingers 145. Also adjustably secured to the rod 153 by means of a bracket 156 is a laterally disposed roller 157. Mounted on the upper surface of the retainer is a substantially horizontal guideway 158, in which reciprocates a picker rod 159 carrying a cam device consisting of spaced alined bars 160 forming a cam slot 161 with which the roller 157 engages. The bars 160 are supported on the picker rod by means of standards 162. The inner end of the picker rod is pivotally connected to a connecting rod 163 adjustably connected to a rock arm 164 secured to a rock shaft 165 mounted on the standard 166 on the platform 4; and the rock shaft 165 carries a gear wheel 167 which meshes with a vertically disposed rack 168 carried by the head 39.

The tracks 144 and the flanges 146 of the supporting fingers 145 are designed to be in substantial horizontal alinement when the fingers are in supporting position, and as the tracks 144 are also substantially level with the upper ply of the endless belt, the boxes may be readily moved from the belt along the tracks onto the flanges 146. Above the passageway leading from the belt to the retainer is a horizontal flange 169 extending transversely of the belt and serving to maintain the boxes horizontal in their passage from the belt to the retainer. Pivoted above the flange 169 is a gravity pawl or switch 170. Connected to the end portion of the picker rod 159 is a picker finger which is designed, as the rod 159 is moved toward the retainer to engage an outside wall of the box and move the same along the track into the retainer. When the rod 159 moves in the opposite direction, or from the retainer, the picker finger is designed to avoid contact with any box which may have subsequently been moved into its path. The picker finger comprises an upper portion or plate 171 adjustably fastened to the picker rod 159 and laterally disposed with respect thereto so as to be in the vertical plane of the stationary position of the boxes engaging the stop 137. Depending from and pivoted to the plate 171 is another preferably curved plate 172, the lower end of which is designed to contact the wall of the box as the picker moves toward the retainer. The plate 172, preferably by a leaf spring 173, is yieldingly held from movement against such resistance as may be caused by a box when moved forwardly, said spring being secured to a fixed part of the picker and pressing loosely against the rear portion of the plate 172. Projecting laterally from the pivoted portion of the picker is a stud 174. As the picker moves toward the retainer the stud 174 passes beneath the pawl or switch 170 and beyond the point of the switch. On the reverse motion of the picker the stud 174 encounters the switch 170 and the engaging end of the plate 172 is thereby lifted and passes across the belt out of contact with any box which may be in vertical alinement therewith. Having reached the end of its reverse movement, the stud drops from the switch and the plate 172 returns to position with its lower end in the path of the box, such return being assisted by a tension spring 175 secured thereto and to a fixed part of the picker. Should any unusual resistance be encountered in the transfer of the box from the belt carrier to the retainer, the spring 173 permits the picker finger to yield.

Means are provided for stopping the movement of the cross head 39 when desired, without interfering with the movement of the remaining portions of the machine. This means consists preferably of a depending rod 176 pivoted to the bed plate and having a projecting rest 177 which may be moved into and out of the path of the cross piece 41 of the cross head by means of a rod 178 extending to any convenient point within the reach of the operator.

Operation: A bundle or series of superposed labels is placed in the label holder 55 and rests against the plates 56, which are adjusted by means of the pins 58 to properly support and hold the bundle. The lower face of the bundle of labels contacts with the projections 57 of the plates 56 and the bundle rests in the holder securely but permitting the efficient feed of the labels downward by gravity. A suitable adhesive is placed in the tank 102. The machine is then started by throwing the clutch 18 to couple the shaft 15 with the driving mechanism. By means of the several operating devices previously described, motion is communicated to the several parts and the carrier 5 rotates intermittently under the influence of the pin wheel and Geneva gear. Boxes are fed or placed on the endless belt carrier 130 and are delivered thereby into position in front of the retaining device. While a box rest is moving into position beneath the retaining device the picker is reciprocated, the plunger in the retainer elevated, and a box delivered to the retainer, and when the box rest becomes stationary beneath the retainer the fingers 145 separate under the influence of their operating devices and release the box, which drops from the retainer onto the box rest and into telescopic relationship therewith, this movement being positively determined, should it be required, by the downward movement of the plunger 152. The next movement of the carrier 5 conveys the box to an intermediate position between the retainer and the glue pad. In its second position the box is exposed to the view of the operator and any defects therein or other objections thereto may be noted and the box removed, if necessary. It is obvious, however, that this step in the operation of the device may be dispensed with, if desired, by reducing the number of box rests. The next step in the operation of the carrier places the box beneath the glue pad 53, which has been coated with glue in a manner clear from the foregoing explanation. The plunger 39 descends and the glue is applied to the surface of the box. Retreat of the box with that of the plunger is prevented by the fingers 54. The next movement of the box carrier places the glued box beneath the label holder and the subsequent downward movement of the plunger applies the label thereto. The box then moves to position beneath the presser 60 and a series of taps or blows is given to the label, the same being designed to smooth and spread out the label over the surface of the box and drive out any air bubbles. The next movement of the carrier conveys the box and the label beneath the spring presser 71 where a strong but yielding pressure is applied. The box is then carried beneath the auxiliary plunger 76, where a second series of blows or pressures is delivered thereto. The labeled box is then presented to the stripper mechanism, whereby its inner edge is disengaged from the box rest and it is thrust or knocked to one side into a suitable receptacle into which it is designed to drop, label side up.

It will be observed that by approximating the number of box rests with the number of operations performed in labeling the box, the machine will produce a completely labeled box for each single operation. It will further be observed that by combining the mechanism for producing several of the operations into a single structure, the machine is simplified and rendered more efficient and less liable to get out of order.

It will further be noted that each cycle of operation of the machine results in the production of a completely labeled box, as well as in the performance of part of the labeling operation, so that by the invention described completely labeled boxes are produced at a speed dependent only on the rapidity with which a partial labeling operation may be performed.

The mechanism above described comprises a machine which is simple to operate, and highly satisfactory in use, and one which efficiently accomplishes the several objects of the invention hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In an apparatus of the character described, in combination, means for telescopically supporting a box, movable means for transferring a label to the box, means for affixing the label to the box, and movable means for stripping the box from its support.

2. In an apparatus of the character described, in combination, means for telescopically supporting a box, means for affixing a label to the box, and reciprocatory means for stripping the box from its support.

3. In an apparatus of the character described, in combination, a box rest, a presser pad adapted to move toward the rest under the influence of gravity, a cross head supporting said pad, a link connected to the cross head, a cam, a lever pivotally connected to said link and having a portion coöperating with the cam to positively move the pad away from the rest.

4. In an apparatus of the character described, in combination, means for feeding a box, means for gluing a label thereto, and means for applying to the label a series of light blows.

5. In an apparatus of the character described, in combination, means for supporting a box element, a presser, and means to move the presser toward and from said support to apply a series of blows or taps to the box element.

6. In an apparatus of the character described, in combination, a box rest, a presser mounted to move toward and from the rest, a cam having a plurality of closely arranged operating portions, means adapted to contact the cam and connected to the presser to operate the same, and means to operate the cam.

7. In an apparatus of the character described, in combination, a frame, a movable box rest, a presser pad adapted to move toward and from the rest, a supporting rod to which the pad is fixed guided on the frame alongside the path of the rest, a spring connected to the rod and the frame and adapted to separate the pad and the rest, a lever pivotally connected to the rod, and a cam adapted to move the rod to move the pad toward the rest.

8. In an apparatus of the character described, in combination, a box rest, a presser pad, means to intermittently move the rest into and out of coöperative relation with the pad, and means to move the pad a plurality of times toward the rest between the movements of the rest.

9. In an apparatus of the character described, in combination, means for telescoping a box with a supporting device, means for labeling the box, and means for withdrawing the said box from said support.

10. In an apparatus of the character described, in combination, means for telescoping a box with a supporting device, means for labeling the box, and means for raising the box from said support and removing it to one side.

11. In an apparatus of the character described, in combination, a movable carrier adapted to support a box, means for labeling the box, stripping mechanism, and means dependent on the movement of the carrier to operate the stripping mechanism.

12. In an apparatus of the character described, in combination, a movable carrier adapted to telescopically support a box, means for labeling the box, a stripping mechanism, and means whereby the movement of the carrier past the stripping mechanism raises the box from its carrier.

13. In an apparatus of the character described, in combination, a movable carrier adapted to telescopically support a box, means for labeling the box, means for moving the carrier in a certain path, a stripping plunger adapted to operate at an angle to the path of movement of the carrier, means to move the box into the path of the stripping plunger, and means to operate the plunger.

14. In an apparatus of the character described, in combination, a table, a series of rests thereon adapted to support boxes, means to label the boxes, means to rotate the table step by step, a stripping mechanism, and means for operating the stripping mechanism successively to strip the boxes from the box rests between the intervals of rest thereof.

15. In an apparatus of the character described, in combination, a table, a series of rests thereon adapted to support boxes, means to label the boxes, means to move the table step by step, a stripping plunger adapted to move back and forth over the box rests, a lever connected to the plunger and adapted to be moved in one direction by the box rests, and a spring adapted to move the lever in the opposite direction.

16. In an apparatus of the character described, in combination, a table, a series of rests thereon adapted to support boxes, means to label the boxes, means to move the table step by step, a stripping plunger adapted to move back and forth over the box rests, a lever connected to the plunger and adapted to be moved in one direction by the box rests, a spring adapted to move the lever in the opposite direction, and means to place boxes successively in the path of the plunger.

17. In an apparatus of the character described, in combination, a table adapted to rotate intermittently, a series of rests spaced thereon adapted to support boxes, means to label the boxes, a plunger operable above the plane of the box rests and across their line of movement, means whereby the movement of the table reciprocates the plunger between its intervals of rest, and means to place the boxes successively in line with the plunger between the intervals of rest.

18. In an apparatus of the character described, in combination, a table adapted to rotate step by step, a series of box rests thereon, means adapted to operate to successively press the boxes when the table is at rest, and means connected to the pressing means to move the boxes with respect to their rests between the intervals when the boxes are stationary.

19. In an apparatus of the character described, in combination, a table, a series of rests thereon adapted to support boxes, means to label the boxes, a stripping plunger, means to reciprocate the plunger across the line of movement of the box rests, comprising a trip lever having a finger disposed in the path of the box rests, and means to place the boxes successively in the path of the plunger.

20. In an apparatus of the character described, in combination, a conveyer frame having parallel side bars having inwardly extending flanges, an endless conveyer belt between the bars and supported by the flanges and adapted to convey a series of boxes to a determined position, means for operating the belt, a series of box carriers, means adapted to transfer the boxes successively from the belt to the carriers, and means for affixing labels to the boxes.

21. In an apparatus of the character described, in combination, a box support adapted to freely support a box, a label holder, means for applying glue to a box on the support, means to move the label holder to press a label on the glued surface of the box, and means adapted to be interposed between the box and the label holder to prevent the box following the retreat of the label holder.

22. In an apparatus of the character described, in combination, means for moving a series of contiguous boxes, a stop in the path of the boxes, a yielding presser adapted to prevent the series from buckling, a box support, and means for removing the boxes from said series one by one to the support.

23. In an apparatus of the character described, in combination, a belt conveyer adapted to freely support and frictionally move a series of contiguous boxes resting thereon, means adapted to increase the pressure between the boxes and the belt, a stop in the path of the boxes, a box support and means for moving the boxes from the belt to the support.

24. In an apparatus of the character described, in combination, a table, means on the table to position a series of boxes, a box retainer having an open bottom portion and box-supporting fingers, means to move the positioning means step by step past the retainer in line with the open bottom, and means to deliver boxes successively from the retainer to the positioning means.

25. In an apparatus of the character described, in combination, an endless belt box carrier, a box retainer, a rod extending across the carrier in the path of the boxes and adapted to stop the boxes, a picker finger adapted to reciprocate transversely of the carrier and adjacent the rod, and means carried by the rod to throw the picker finger into and out of the path of the boxes.

26. In an apparatus of the character described, in combination, an endless belt box carrier, a box retainer, a rod extending across the carrier in the path of the boxes and adapted to stop the boxes, a picker finger adapted to reciprocate transversely of the carrier and adjacent the rod, and a switch adapted to throw the picker finger into and out of the path of the boxes.

27. In an apparatus of the character described, in combination, a box retainer having side walls and an open bottom portion, pivoted plates having flanges adapted to project toward each other between the walls, and means to operate the plates to move the flanges into and out of said projecting position.

28. In an apparatus of the character described, in combination, a box retainer having side walls and an open bottom portion, pivoted plates having flanges and slotted cam portions, the former adapted to project toward each other between the walls, and means engaging the slots in the arms to move the flanges into and out of said projecting position.

29. In an apparatus of the character described, in combination, a rod, a picker finger pivoted thereto, means for reciprocating the rod and spring means adapted to yieldingly resist movement of the picker finger in either direction.

30. In an apparatus of the character described, in combination, fingers adapted to move toward and from each other to support a box, a picker adapted to deliver a box between said fingers, a plunger movable between the fingers and adapted to contact the box, connections between the plunger and fingers to govern the movement of the latter, and means whereby the movement of the picker operates the plunger.

31. In an apparatus of the character described, in combination, a table, a box rest carried thereby having walls adapted to engage the inner wall of a box, means adapted to place a box in engaging position on the rest, label applying mechanism, and means to move the table to carry the box rest into label applying position.

32. In an apparatus of the character described, in combination, a table, a box rest carried thereby having continuous upright walls adapted to engage the inner walls of a box, means adapted to telescope a box with the rest, label applying mechanism, and means to move the table intermittently to carry the rest into and out of position beneath the label applying mechanism.

33. In an apparatus of the character described, in combination, a table, a box rest carried thereby having walls adapted to engage the inner wall of a box and a dovetailed extension, wedge blocks adapted to grip the extension, adjustable means for clamping the wedge blocks in gripping position, label applying mechanism, and means to move the table to carry the box rest into label applying position.

34. In an apparatus of the character described, in combination, a table, means on the table to telescopically engage a box and support the surface to be glued, glue applying mechanism comprising a stationary glue reservoir, means to move the table to carry the box into glue applying position and means to apply a label to the box.

35. In an apparatus of the character described, in combination, a table, means on the table to position and prevent lateral movement of a box and brace the surface to be labeled, label applying mechanism, and means to move the table to carry the box into label applying position.

36. In an apparatus of the character described, in combination, a table, means on the table to position a box and support a surface thereof, glue applying mechanism comprising a stationary glue reservoir, label applying mechanism, and means to move the table to carry the supported surface into glue applying and label applying position.

37. In an apparatus of the character described, in combination, a table, means on the table to position a box and support a wall thereof, glue applying mechanism comprising a stationary glue reservoir, label applying mechanism, and means to move the table intermittently to carry the supported wall step by step into glue applying and label applying position.

38. In an apparatus of the character described, in combination, an elevated box rest adapted to support a box in inverted position and brace a wall thereof, means to apply glue to said wall and means to affix a label to said wall.

39. In an apparatus of the character described, in combination, an elevated box rest adapted to support a box in inverted position and brace a wall thereof, means to apply glue to said wall, means to affix a label to said wall and means to press said label against said wall.

40. In an apparatus of the character described, in combination, an elevated box rest adapted to support a box in inverted position and brace a wall thereof, means to apply glue to said wall, means to affix a label to said wall, means to press said label against said wall and means to strip the box from said rest.

41. In an apparatus of the character described, in combination, means adapted to convey boxes, a series of rests adapted to support boxes in telescopic position and brace a wall thereof, means adapted to feed the boxes from the conveyer means and apply them to the rests, and means to affix labels to the braced walls of the boxes.

42. In an apparatus of the character described, in combination, means adapted to convey boxes, a series of rests adapted to support boxes in telescopic position and brace a wall thereof, means adapted to feed the boxes from the conveyer means and apply them to the rests, means to apply glue to the braced walls of the boxes and means to apply labels to said walls.

43. In an apparatus of the character described, in combination, means adapted to convey boxes, a series of rests adapted to support boxes in telescopic position and brace a wall thereof, means adapted to feed the boxes from the conveyer means and apply them to the rests, means to apply glue to the braced walls of the boxes, means to apply labels to said walls, and means to press the labels against said walls.

44. In an apparatus of the character described, in combination, means adapted to convey boxes, a series of rests adapted to support boxes in telescopic position and brace a wall thereof, means adapted to feed the boxes from the conveyer means and apply them to the rests, means to apply glue to the braced walls of the boxes, means to apply labels to said walls, and means to strip the labeled boxes from the rests.

45. In an apparatus of the character described, in combination, means adapted to convey boxes, a series of rests adapted to support boxes in telescopic position and brace a wall thereof, means adapted to feed the boxes from the conveyer means and apply them to the rests, means to apply glue to the braced walls of the boxes, means to apply labels to said walls, means to press the labels against said walls, and means to strip the labeled boxes from said walls.

46. In an apparatus of the character described, in combination, means adapted to convey boxes, a series of rests adapted to support boxes in telescopic position and brace a wall thereof, means adapted to feed the boxes from the conveyer means and apply them to the rests, means adapted to adhesively affix labels to the braced walls of the boxes, and means whereby the labels are pressed against the braced walls a plurality of times to securely attach the same to the boxes.

47. In an apparatus of the character described, in combination, a table, a series of rests adapted to support boxes in inverted position and brace a wall thereof, a trough adjacent the table, an endless belt comprising a box conveying portions supported on the trough in a plane above the rests, means for driving the endless belt, a box retainer in alinement with the belt and adapted to support a box in inverted position in line with a stationary position of the respective rests, means adapted to move the rests intermittently, means to transfer boxes from the belt to the retainer, and means to deliver the boxes from the retainer to the rests respectively.

48. In an apparatus of the character described, in combination, a table, means on the table to position a box, glue applying mechanism comprising a stationary glue reservoir, label applying mechanism, separately operating label pressing mechanism, and means to move the table to carry the box step by step into glue applying, label applying and label pressing position.

49. In an apparatus of the character described, in combination, a table, means on the table to position a box, glue applying mechanism comprising a stationary glue reservoir, and a reciprocatory glue pad, label applying mechanism, separately operating label pressing mechanism, box stripping mechanism, and means to move the table to carry the box step by step into glue applying, label applying, label pressing and box stripping position.

50. In an apparatus of the character described, in combination, a table, means on the table to position a box, means to feed a box to the positioning means, comprising a fixed guideway and means for sliding a box along the guideway to the positioning means, glue applying mechanism, means to move the table to carry the box into glue applying position, and means adapted to apply a label to the box.

51. In an apparatus of the character described, in combination, a table, means on the table to position a box, means to feed a box to the positioning means, comprising a guideway and a stationary box retainer above the table, glue applying mechanism, label applying mechanism, and means to move the table to carry the box into glue applying and label applying position.

52. In an apparatus of the character described, in combination, a table, means on the table to position a box, means to feed a box to the positioning means, comprising a track across the edge of the table and a reciprocating picker, glue applying mechanism, label applying mechanism, and means to move the table intermittently to carry the box step by step into glue applying and label applying position.

53. In an apparatus of the character described, in combination, a table, means on the table to position a box, means to feed a box to the positioning means, comprising a track across the edge of the table, a fixed retainer adapted to receive the box from said track, means to deliver the box from the retainer to the positioning means, glue applying mechanism, separately operated label applying mechanism and label pressing mechanism, and means to move the table to carry the box step by step into glue applying, label applying and label pressing position.

54. In an apparatus of the character described, in combination, a table, means on the table to position a box, means to feed a box to the positioning means, comprising a guideway continuous across the edge of the table and a retainer adapted to support without pressing the box, glue applying mechanism, separately operated label applying mechanism and label pressing mechanism, box stripping mechanism, and means to move the table to carry the box step by step into glue applying, label applying, label pressing and box stripping position.

55. In an apparatus of the character described, in combination, a bed plate having a bearing projection, a table journaled on said bearing and supported by the bed plate, a space being provided between the table and plate, driving mechanism comprising gearing located in said space adapted to rotate the table, means carried by the table adapted to position a plurality of boxes, and label applying mechanism relatively to which the positioning means move upon operation of the gearing.

56. In an apparatus of the character described, in combination, a bed plate having a cylindrical upright projection, a horizontal table having an opening surrounding said upright portion, a Geneva gear wheel secured to said table, bearing on said projection and said bed plate, a rotary pin wheel intermediate the table and the bed and adapted to intermittently rotate the table, box rests on said table, label applying mechanism relatively to which the box rests are moved upon operation of the pin wheel, and means for operating said pin wheel.

57. In an apparatus of the character described, in combination, a rotatably mounted table, means on the table to telescopically support a box, means to feed a box to the supporting means, glue applying mechanism, label applying mechanism, a Geneva gear wheel operatively connected to the table, and a pin wheel coöperating therewith to rotate the table intermittently to carry the box step by step into glue applying and label applying position.

58. In an apparatus of the character described, in combination, a rotatably mounted table, means on the table to position a box, means to feed a box to the positioning means comprising a guideway across the edge of the table, glue applying mechanism comprising a stationary glue reservoir, label applying mechanism, separately operating label pressing mechanism, and means to rotate the table to carry the box step by step into glue applying, label applying and label pressing position.

59. In an apparatus of the character described, in combination, a rotatably mounted table, means on the table to position a box, means to feed a box to the positioning means comprising a guideway continuous across the edge of the table to the positioning means, glue applying mechanism comprising a stationary glue reservoir, label applying mechanism, separately operating label pressing mechanism, box stripping mechanism adapted to operate by movement of the table, and means to rotate the table to carry the box step by step into glue applying, label applying, label pressing and box stripping position.

60. In an apparatus of the character described, in combination, a rotatably mounted table, means on the table to support a plurality of boxes spaced apart, means to feed boxes to the supports comprising a guideway across the edge of the table, glue supplying means comprising a stationary glue reservoir and a movable glue pad, a label magazine, a plurality of label pressers, means to rotate the table to carry the boxes on the supports step by step into position adjacent the glue pad, the label magazine and the respective pressers, means to move the glue pad to apply glue to the respective boxes, means to cause contact between labels held in the magazine and the respective glued boxes, and means to cause the labeled boxes and pressers to respectively contact to press the labels against the boxes.

61. In an apparatus of the character described, in combination, means to feed boxes to a certain position, a series of box supporting devices, means to move the devices into receiving position with relation to the feeding means, and relatively stationary means comprising a reciprocatory plunger adapted to transfer the boxes one by one from the feeding means to the box supporting devices.

62. In an apparatus of the character described, in combination, means to feed boxes to a certain position, a series of box supporting devices, means to intermittently move the devices into receiving position with relation to the feeding means, and means comprising a relatively stationary retainer adapted to transfer the boxes from the feeding means to the box supporting devices.

63. In an apparatus of the character described, in combination, means to feed boxes to a certain position, a series of box supporting devices, means to intermittently move the devices into receiving position with relation to the feeding means, and means comprising a relatively stationary retainer and picker adapted to transfer the boxes one by one from the feeding means to the box supporting devices.

64. In an apparatus of the character described, in combination, means to feed boxes to a certain position, a series of box supporting devices, means to intermittently move the devices into receiving position with relation to the feeding means, and substantially horizontal reciprocatory means operating across the plane of the path of the boxes to transfer the boxes one by one from the feeding means to the box supporting devices.

65. In an apparatus of the character described, in combination, a glue supply, a glue pad, means adapted to roll on the pad to apply glue thereto, means to insure rolling motion of the last mentioned means on the pad, means to support a box adjacent the pad, means to move the pad to apply glue to the box, and means to apply a label to the box.

66. In an apparatus of the character described, in combination, a glue supply, a glue pad, roller means adapted to transfer glue from the supply to the pad, means to direct the rotation of the roller, means to support a box adjacent the pad, means to move the pad to apply glue to the box, and means to apply a label to the box.

67. In an apparatus of the character described, in combination, a glue supply comprising a delivery roller, means to rotate the delivery roller, a glue pad spaced from the delivery roller, means adapted to transfer glue from the delivery roller to the pad comprising a glue applying roller, friction means to direct the rotation of the glue applying roller in contact with the pad, means to support a box adjacent the pad, means to move the pad to apply glue to the box, and means to apply a label to the box.

68. In an apparatus of the character described, in combination, a glue supply comprising a delivery roller, means to rotate the delivery roller, a glue pad spaced from the delivery roller, means adapted to transfer glue from the delivery roller to the pad comprising a glue applying roller, a friction wheel on the glue applying roller, a plate in the path of the wheel adapted to contact therewith prior to contact of the applying roller and pad, means to support a box adjacent the pad, means to move the pad to apply glue to the box, and means to apply a label to the box.

69. In an apparatus of the character described, in combination, a glue supply, a glue pad spaced therefrom, means adapted to transfer glue from the supply to the pad comprising a reciprocatory device including a glue applying roller adapted to pass beyond the pad at either side, a friction plate located adjacent the pad and extending beyond the same at either end, means carried by the transfer means adapted to contact with the friction plate to direct rotation of the roller prior to contact with the pad in either direction of movement, means to support a box adjacent the pad, means to move the pad to apply glue to the box, and means to apply a label to the box.

70. In an apparatus of the character described, in combination, a glue supply, a box supporting device, a glue pad adapted to reciprocate toward and from the supporting device, a stop device interposed between the pad and supporting device and means adapted to apply a label to the box.

71. In an apparatus of the character described, in combination, a rotary table, box rests carried thereby in an endless path, a reciprocatory glue pad, fingers stationarily supported in the path of the pad above the path of the box rests, means to rotate the table step by step to position the rests in line with the pad, means to reciprocate the pad toward and from the rest and means adapted to apply labels to the boxes.

72. In an apparatus of the character described, in combination, a glue supply, means to convey a series of boxes, horizontally spaced guideways leading from the glue supply toward the path of the boxes, a frame adapted to reciprocate in the guideways, a glue applying roller carried by the frame, a glue pad adapted to reciprocate in line with the path of the boxes and receive glue from the applying roller, means to reciprocate the glue applying roller and means to apply labels to the boxes.

73. In an apparatus of the character described, in combination, a box support, a label holder, spring fingers carried by the label holder in the path of the labels and spaced from the holder, and means to move the holder toward and from the support.

74. In an apparatus of the character described, in combination, a rotary table, a series of box rests carried thereby, a label holder, spring fingers carried by the label holder in the path of the labels and spaced from the holder, means to carry the rests one by one into stationary position with respect to the holder, and means to move the holder toward and from the box rest in position.

75. In an apparatus of the character described, in combination, a box labeling element comprising a unitary structure having integral arms adapted to support glue applying and label pressing means and an integral label holder embodied therein.

76. An apparatus of the character described, in combination, a box labeling plunger comprising parallel guide bars, a cross head connecting said bars, and comprising spaced integral supporting arms and intermediate integral label holding means.

77. In an apparatus of the character described, in combination, a rotary table, a series of box rests spaced thereon, means to move the table to move the rests in an endless path, glue applying mechanism, label holding mechanism, label pressing mechanism carried by the label holding mechanism adapted to move toward and from the table in the path of the box rests, means for simultaneously moving said mechanism toward and from the box rests and separately movable label pressing mechanism adapted to move toward and from the table.

78. In an apparatus of the character described, in combination, a horizontal table comprising devices adapted to support a plurality of boxes open in fixed position thereon, means to rotate the table intermittently, an endless belt carrier adapted to position a plurality of boxes alongside said table, and reciprocating transfer devices adapted to transfer the boxes from the endless belt carrier to the supporting devices and preseve the relative position of the open side of the box.

79. In an apparatus of the character described, in combination, a horizontal table comprising devices adapted to support a plurality of boxes in fixed position thereon, means to rotate the table intermittently, an endless belt carrier adapted to position a plurality of boxes alongside said table, a box alining device above the table comprising box engaging arms, picker mechanism adapted to transfer the boxes from the carrier to the alining device, and means adapted to eject the boxes from the alining device onto the supporting devices.

80. In an apparatus of the character described, in combination, a horizontal table comprising devices adapted to support a plurality of boxes, means to rotate the table, a platform supported centrally of the table, means adapted to position boxes at the side of the table, and transfer devices supported by the platform, and adapted to move the boxes from the positioning means to the box supporting devices.

81. In an apparatus of the character described, in combination, a horizontal table comprising devices adapted to support a plurality of boxes, means to rotate the table, a stationary platform supported centrally of the table, means adapted to position boxes at the side of the table, and means supported by the platform to transfer the boxes from the positioning means to the supporting devices, comprising an alining device, a picker, and means to deliver the boxes from the alining device to the supporting devices.

82. In an apparatus of the character described, in combination, a horizontal table comprising devices adapted to support a plurality of boxes, means to rotate the table, a stationary platform supported centrally of the table, means adapted to position boxes at the side of the table, and means supported by the platform to transfer the boxes from the positioning means to the supporting devices, comprising an alining device, movable arms adapted to engage the boxes, a picker adapted to transfer the boxes from the positioning means to the alining device, means to deliver the boxes from the alining device to the box supporting devices, and coöperative operating connections between the picker and the delivery means.

83. In an apparatus of the character described, in combination, a horizontal table comprising devices adapted to support a plurality of boxes, means to rotate the table, a stationary platform centrally of the table, means adapted to position boxes at the side of the table, means supported by the platform comprising mechanism adapted to transfer the boxes from the positioning means to the supporting devices, box labeling mechanism, and operative connections between the box labeling mechanism and the transfer mechanism.

84. In an apparatus of the character described, in combination, a horizontal table comprising devices adapted to support a plurality of boxes, means to rotate the table, a stationary platform centrally of the table, means adapted to position boxes at the side of the table, means supported by the platform comprising mechanism adapted to transfer the boxes from the positioning means to the supporting devices, an operating gear wheel therefor, a glue applying and label applying device above the table, and comprising a rack meshing with said gear wheel, and means to reciprocate the glue applying and label applying device.

85. In an apparatus of the character described, in combination, a table adapted to support a plurality of boxes, a glue carrier adapted to reciprocate across the path of the boxes, a glue pad adapted to move toward and from the boxes, means to move the table step by step, and means to apply labels to the boxes.

86. In an apparatus of the character described, in combination, a table adapted to support a plurality of boxes, means to rotate the table intermittently, guides extending across the path of the boxes, devices adapted to apply glue to the boxes, comprising a glue carrier movable on said guides, and means to apply labels to the boxes.

87. In an apparatus of the character described, in combination, a table adapted to support a plurality of boxes, means to rotate the table intermittently, a glue pad adapted to move toward and from the boxes, a guiding device extending across the path of the boxes, a glue carrier movable on said guide adapted to deliver glue to the pad, and means to apply labels to the boxes.

88. In an apparatus of the character described, in combination, a table adapted to support a plurality of boxes, means to rotate the table intermittently, a glue pad adapted to move toward and from the boxes, a guiding device extending across the path of the boxes, a glue roller supported by said guide, means to reciprocate said roller on said guide to deliver glue to the pad, and means to apply labels to the boxes.

89. In an apparatus of the character described, in combination, a table adapted to support a plurality of boxes, means to rotate the table intermittently, a glue pad adapted to move toward and from the boxes, guides in a plane above the path of the boxes, a frame supported by said guides, a glue carrier supported by said frame and adapted to contact the pad, a reciprocatory lever, connections between said lever and the frame, means to reciprocate said lever and means to apply labels to the boxes.

90. In an apparatus of the character described, in combination, a table adapted to support a plurality of boxes, means to rotate the table intermittently, a glue pad adapted to move toward and from the boxes, guides extending across the path of the boxes, a frame supported by said guides, a glue carrier supported by said frame, a reciprocatory lever, connections between said lever and the frame, means to reciprocate said lever, and means to apply labels to the boxes.

91. In an apparatus of the character described, in combination, a table adapted to support a plurality of boxes, means to rotate the table intermittently, a glue pad adapted to move toward and from the boxes, guides extending across the path of the boxes, a frame supported by said guides, a glue carrier supported by said frame, a reciprocatory lever, connections between said lever and the frame, cam means to reciprocate said lever and cause movement of the glue carrier in one direction for each intermittent movement of the table, and means to apply labels to the boxes.

92. In an apparatus of the character described, in combination, a table adapted to support a plurality of boxes, means to move the table intermittently, a platform centrally of the table, a glue supply, a glue pad, a guide device comprising supports on the platform, a glue carrier adapted to convey glue from the supply to the pad and movable on said guide, means adapted to apply labels to the boxes, and means to move the glue carrier between the glue supply and the pad.

93. In an apparatus of the character described, in combination, a bed plate, a table adapted to support a plurality of boxes mounted on the bed plate, a reciprocatory cross head, guided in the bed plate, label holding and pressing devices carried by the cross head above the table, separate label pressing means above the table and guided in the bed plate, and means to operate the cross head and the separate label pressing means comprising a drive shaft, and cam means operated thereby.

94. In an apparatus of the character described, in combination, a table having a plurality of box rests thereon, means adapted to position boxes adjacent the table, comprising movable box supporting devices, means adapted to rotate the table intermittently, a glue carrier above the table, a label carrier above the table, a label presser above the table, box stripping mechanism, and means whereby the several elements are operated to feed boxes to the rests, label the boxes, and remove the boxes from the rests.

95. In an apparatus of the character described, in combination, a bed plate, a table adapted to support a plurality of boxes mounted on the bed plate, a reciprocatory head having a plurality of supporting and guiding rods coöperatively associated with the bed plate, labeling devices carried by the head above the table, and means to reciprocate the supporting and guiding rods to thereby move the labeling devices toward and from the table.

96. In an apparatus of the character described, in combination, a bed plate, a table adapted to support a plurality of boxes mounted on the bed plate, a reciprocatory cross-head guided in the bed plate, labeling devices carried by the cross-head above the table, a link connected to the cross-head, a lever pivotally connected to said link, a drive shaft, and a cam on the latter adapted to operate the lever to reciprocate the cross-head.

97. In an apparatus of the character described, in combination, a table, a box rest supported thereby, a glue pad adapted to move toward and from the rest, a glue reservoir supported independently of the pad, separate means adapted to transfer glue from the reservoir to the pad, label applying mechanism, and means adapted to operate the table to move the rest into glue applying and label applying position.

98. In an apparatus of the character described, in combination, a table, a box rest supported thereby, a label magazine movable toward and from the rest, a presser movable independently of the label magazine, means adapted to move the label magazine to apply a label to a box on the rest, and means adapted to operate the presser independently of the label holder.

99. In an apparatus of the character described, in combination, a table, a rest supported thereby and adapted to support a box, means adapted to affix a label to the box, a separately operated presser mechanism movable toward and from the rest to press the label on the box, and means whereby the presser device is operated to apply a plurality of pressures to each label affixed to the box.

100. In an apparatus of the character described, in combination, a bed plate, an intermittently rotatable table carried thereby and provided with a series of box rests, a conveyer adapted to deliver boxes adjacent the path of the rests, means comprising a picker adapted to slide boxes from the conveyer to the rests when in stationary position, a glue reservoir comprising a glue feed roller, a glue pad, reciprocatory glue applying means adapted to transfer glue from the reservoir to the pad, a label holder, a label pressing device, box stripping means, the glue pad, label holder and label pressing device being normally spaced above and adjacent the rests, a shaft, means adapted to continuously drive said shaft, gear connections between said shaft and table adapted to rotate the table intermittently, operating connections between said shaft and the glue feed roller, a rotatable cam driven from said shaft and connections therefrom operating to cause the glue pad and the boxes on the rests to respectively contact, a second rotatable cam driven from said shaft and connections therefrom operating to cause the label pressing device and the labeled boxes to respectively contact, means comprising a third rotatable cam and connections therefrom to cause the labels and the glued walls of the boxes to respectively contact, and means whereby the box stripping means is operated to remove the labeled boxes from the rests.

101. In an apparatus of the character described, in combination, means adapted to support and intermittently move boxes in an endless path, an endless belt conveyer adjacent the support adapted to convey boxes, means interposed in the path of the boxes on the conveyer adapted to arrest the boxes in predetermined position, relatively stationary box retaining means located above the endless path of the boxes at a stationary point in their path of movement, reciprocatory means adapted to engage the boxes in position on the belt and successively positively move them to the box retaining means, means whereby the retaining means is caused to successively discharge the boxes in definite position onto the intermittently movable support, and means adapted to firmly glue a label to each box.

102. In an apparatus of the character described, in combination, means adapted to support in definite position and intermittently move boxes in an endless path, means adapted to successively feed boxes into position on said support, a pad having a glue retaining surface corresponding in extent with the portion of the box to be glued disposed in alinement with a stationary point in the endless path, a stationary glue tank, means adapted to transfer glue from the tank to the said surface of the pad, means adapted to move the pad to cause its glued surface to apply glue to a definite portion of the wall of the boxes when they are stationarily in alinement therewith respectively, means adapted to remove the pad from the glued surface, and means adapted to press a label onto the glued surface of the boxes.

103. In an apparatus of the character described, in combination, means adapted to support in definite position and intermittently move boxes in an endless path, means adapted to successively feed boxes into position on said support, a pad having a glue retaining surface corresponding in extent with the portion of the box to be glued disposed in alinement with a stationary point in the endless path, a stationary glue tank, a glue delivery roller fed therefrom, a glue applying roller, means adapted to move the applying roller from the delivery roller across the pad to apply glue to said surface of the pad, means adapted to move the pad to cause its glued surface to apply glue to a definite portion of the wall of the boxes when they are stationarily in alinement therewith respectively, means adapted to remove the pad from the glued surface, and means adapted to press a label onto the glued surface of the boxes.

104. In an apparatus of the character described, in combination, means adapted to support in definite position and intermittently move boxes in an endless path, means adapted to successively feed boxes into position on said support, a pad having a glue retaining surface corresponding in extent with the portion of the box to be glued disposed in alinement with a stationary point in the endless path, a stationary glue tank, a glue delivery roller fed therefrom, a glue applying roller, means adapted to move the applying roller from the delivery roller across the pad to apply glue to said surface of the pad, comprising a slidable frame carrying the glue applying roller, fixed guides for said frame, a rock lever connected to said frame, means for operating said lever to reciprocate the frame, means adapted to move the pad to cause its glued surface to apply glue to a definite portion of the wall of the boxes when they are stationarily in alinement therewith respectively, means adapted to remove the pad from the glued surface, and means adapted to press a label onto the glued surface of the boxes.

105. In an apparatus of the character described, in combination, means adapted to support in definite position and intermittently move boxes in an endless path, means adapted to successively feed boxes into position on said support, a pad having a glue retaining surface corresponding in extent with the portion of the box to be glued, a movable cross-head carrying the pad, a plurality of spaced rods adapted to support the pad opposite a stationary point in the endless path and guide the pad relative thereto, a cross piece joining said rods, means comprising a cam adapted to reciprocate the cross-head to cause the surface of the pad to apply glue to a definite portion of the wall of the boxes and retreat therefrom when they are stationarily in position relative to the pad, a glue tank, means adapted to transfer glue from the tank to the retaining surface of the pad, and means adapted to apply a label to the glued surface of the boxes.

106. In an apparatus of the character described, in combination, means adapted to support in definite position and intermittently move boxes in an endless path, means adapted to successively feed boxes into position on said support, a pad having a glue retaining surface corresponding in extent with the portion of the box to be glued, a glue supply, a glue delivery roller fed therefrom, a glue applying roller, means adapted to move the applying roller from the delivery roller across the retaining surface of the pad to apply glue thereto comprising a translatable frame carrying the glue applying roller, guides for said frame, a rock lever connected to said frame, means for operating said lever to reciprocate said frame, a movable cross-head carrying the pad, parallel rods adapted to support the pad opposite a stationary point in the endless path and guide the pad relative thereto, a cross piece joining said rods, means comprising a cam adapted to reciprocate the cross-head to cause the surface of the pad to apply glue to a definite portion of the wall of the boxes and retreat therefrom when they are stationarily in position relative to the pad, a glue tank, means adapted to transfer glue from the tank to the retaining surface of the pad, and means adapted to apply a label to the glued surface of the boxes.

107. In an apparatus of the character described, in combination, a carrier, means to intermittently rotate the same, box retaining means comprising blocks projecting from the carrier adapted to telescope the boxes and brace a wall thereof, said carrier having means to retain the blocks thereon in relatively circumferentially fixed position, a label magazine, and means whereby labels from the magazine are affixed to the braced walls of the boxes when the blocks are in position therebeneath.

108. In an apparatus of the character described, in combination, means adapted to support and intermittently move boxes in an endless path and to brace a box wall to be labeled, a cross-head, parallel supporting rods secured to the cross head, a presser pad intermediate said rods, spring means interposed between the presser pad and the cross-head adapted to yieldingly attach the presser pad to the cross-head, means adapted to affix labels to the braced walks of the boxes, and means adapted to cause the labeled walls of the boxes to be pressed between the pads and the bracing means aforesaid.

109. In an apparatus of the character described, in combination, means adapted to support and intermittently move boxes in an endless path and to brace a box wall to be labeled, a cross-head, parallel supporting rods secured to the cross-head, a presser pad intermediate said rods, spring means interposed between the presser pad and the cross-head adapted to yieldingly attach the presser pad to the cross-head, means adapted to affix labels to the braced walls of the boxes, a rotary shaft, a cam operated thereby, and means whereby the operation of the cam causes the labeled walls of the boxes to be pressed between the presser pads and the bracing means aforesaid.

In testimony whereof I affix my signature, in the presence of two witnesses.

LYNDON C. PALMER.

Witnesses:
FRANK E. DRULLARD,
MARY R. CASS.

Copies of this patent may be obtained for five cents each, by addressing the "Commissioner of Patents, Washington, D. C."